(12) United States Patent
Kim et al.

(10) Patent No.: US 11,115,261 B2
(45) Date of Patent: Sep. 7, 2021

(54) SYSTEM AND METHOD OF SHARING CONTENT BY USING PLURALITY OF STORAGES

(71) Applicant: Samsung Electronics Co., Ltd., Suwon-si (KR)

(72) Inventors: Jae-hwan Kim, Suwon-si (KR); Chang-won Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 92 days.

(21) Appl. No.: 15/991,508

(22) Filed: May 29, 2018

(65) Prior Publication Data

US 2018/0278460 A1  Sep. 27, 2018

Related U.S. Application Data

(63) Continuation of application No. 13/856,001, filed on Apr. 3, 2013, now abandoned.

(30) Foreign Application Priority Data

Apr. 3, 2012 (KR) ........................ 10-2012-0034585

(51) Int. Cl.
*G06F 15/167* (2006.01)
*H04L 29/08* (2006.01)

(52) U.S. Cl.
CPC .... *H04L 29/08549* (2013.01); *H04L 67/1097* (2013.01)

(58) Field of Classification Search
CPC ................ H04L 29/08549; H04L 67/1097
See application file for complete search history.

(56) References Cited

U.S. PATENT DOCUMENTS 8,086,662 B1  12/2011  Doyle et al.
2005/0138192 A1* 6/2005 Encarnacion ........... H04L 67/12
709/230

(Continued)

FOREIGN PATENT DOCUMENTS

JP   2006-505991 A   2/2006
KR  10-2004-0060636 A   7/2004

(Continued)

OTHER PUBLICATIONS

BubbleUPnP, by Bubblesoft, from https://web.archive.org/web/20120204063746/http://evolver.fm/appdb/app/bubbleupnp/ (Feb. 4, 2012) (Year: 2012).*

(Continued)

*Primary Examiner* — Suraj M Joshi
*Assistant Examiner* — Jaren Means
(74) *Attorney, Agent, or Firm* — Jefferson IP Law, LLP

(57) ABSTRACT

A system and method of sharing content by using a plurality of storages is provided. A mobile communication terminal includes a storage information collecting unit collecting a plurality of pieces of storage information about the plurality of storages connected to the mobile communication terminal, a User Interface (UI) generating unit dividing the plurality of storages according to attributes that are previously configured, based on the plurality of pieces of storage information, and generating a storage share setting screen with respect to the plurality of storages, a display unit displaying the storage share setting screen, and a storage setting unit activating sharing of content stored in the plurality of storages, for each of the plurality of storages.

23 Claims, 24 Drawing Sheets

(56) References Cited

U.S. PATENT DOCUMENTS

| | | | |
|---|---|---|---|
| 2006/0101490 A1 | 5/2006 | Leurs | |
| 2008/0022304 A1 | 1/2008 | Prus et al. | |
| 2009/0193469 A1* | 7/2009 | Igarashi | H04N 21/64322 |
| | | | 725/56 |
| 2010/0131613 A1* | 5/2010 | Jonsson | H04L 67/02 |
| | | | 709/218 |
| 2010/0251177 A1 | 9/2010 | Geppert et al. | |
| 2010/0268702 A1* | 10/2010 | Wissner | G06F 16/36 |
| | | | 707/711 |
| 2012/0079054 A1* | 3/2012 | Moroney | H04N 21/4147 |
| | | | 709/213 |

FOREIGN PATENT DOCUMENTS

| | | |
|---|---|---|
| KR | 10-2005-0104146 A | 11/2005 |
| KR | 10-2006-0007623 A | 1/2006 |
| KR | 10-2006-0038656 A | 5/2006 |
| KR | 10-2008-0024582 A | 3/2008 |
| KR | 10-2009-0077166 A | 7/2009 |
| KR | 10-2011-0037247 A | 4/2011 |
| KR | 10-2011-0103515 A | 9/2011 |
| KR | 10-2011-0125724 A | 11/2011 |

OTHER PUBLICATIONS

BubbleUPnP, by Bubblesoft, from http://evolver.fm/appdb/app/bubbleupnp/.
"A Simple Guide to DLNA Video Streaming on Android", by Daniel Kolobaric, published Jul. 20, 2011, from https://web.archive.org/web/20120307142809/http://www.brighthub.com/mobile/google-android/articles/121697.aspx# (hereinafter Bubble2).

* cited by examiner

FIG. 9

| ID | DEVICE DISPLAY NAME | DEVICE NAME | TYPE | ATTRIBUTE | SHARE SETTING | ACCESS KEY | RECENTLY REPRODUCED-CONTENT KEY | ZONE ADDR | DEVICE ADDRESS | MAC ADDRESS (WAKE ON LAN) | CACHE CONTENT GROUP ID |
|---|---|---|---|---|---|---|---|---|---|---|---|
| 001 | Changwon's Phone | Phone | Storage | Default | On | — | — | — | Local | — | — |
| 002 | Changwon's facebook | facebook | Storage | Default | On | Access Key | — | — | www.facebook.com | — | G001 |
| 003 | Changwon's Youtube | Youtube | Storage | Default | Off | Access Key | C001 | — | www.youtube.com | — | G002 |
| 004 | Changwon's Cloud | Cloud | Storage | Default | On | Access Key | — | — | www.cloud.com | — | G003 |
| 005 | My Home PC | Win7: Changwons | Storage | Scan | On | Access Key | C009 | 08:AC:54: D2:C9:38 | 168.219. 134.5 | 00:E0:91: C8:A9:96 | G004 |
| 006 | Living Room Net Storage | WDTVLIVE | Storage | Scan | Off | Access Key | — | 08:AC:54: D2:C9:38 | 168.219. 134.6 | 00:B7:43: B2:A1:58 | G005 |
| 007 | Living Room TV | Samsung TV | Display | Scan | On | — | — | 08:AC:54: D2:C9:38 | 168.219. 134.7 | 00:C7:43: A5:DA:14 | — |

| KEY | Group ID | Title | Played Position | URI | Author | Type | favorite | Like | Total Time |
|---|---|---|---|---|---|---|---|---|---|
| C001 | G002 | TED festival | 5'25" | Ted_fastiaval.flv | Changwon | Video | ON | 5 | 2:28:09 |
| C002 | G002 | 신도여행 | 0'00" | TRAVEL TO JINDO mp4 | Changwon | Video | OFF | 0 | 1:10:09 |

FIG. 13

| ID | USER NAME | TYPE | ATTRIBUTE | SHARE SETTING | CONTENT | CURRENTLY-REPRODUCED CONTENT |
|---|---|---|---|---|---|---|
| aaa | My Sister | PC | Scan | OFF | A.mpg<br>B.mpg | — |
| bbb | Changwon | PHONE | Default | ON | C.mpg<br>D.mpg | C.mpg |
| ccc | Brother | Net Storage | Scan | ON | E.mpg<br>F.mpg | F.mpg |
| ddd | Lindsey | YouTube | Default | OFF | G.mpg<br>H.mpg | — |
|  |  |  |  |  |  |  |

SYSTEM AND METHOD OF SHARING CONTENT BY USING PLURALITY OF STORAGES

PRIORITY

This application is a continuation application of prior application Ser. No. 13/856,001, filed on Apr. 3, 2013, which claimed priority under 35 U.S.C § 119(a) of a Korean patent application number 10-2012-0034585 filed on Apr. 3, 2012, in the Korean Intellectual Property Office, the disclosure of which is incorporated by reference herein in its entirety.

BACKGROUND OF THE INVENTION

1. Field of the Invention

The present invention relates to a system and method of sharing content by using a plurality of storages. More particularly, the present invention relates to a system and method of performing configuration of a share setting on a plurality of content stored in a plurality of storages that are connected to a mobile communication terminal, and of sharing the plurality of content with a display device connected to the mobile communication terminal.

2. Description of the Related Art

Recently, there has been a dramatic increase in a supply of content including television programs, movies, music, books, and the like. The content may be provided not only from various devices that a user uses but also may be provided from various storages including a cloud server, a content providing server, a Social Network Service (SNS) server, and the like. In this regard, it is necessary for the user to efficiently share various types of content provided from the various storages.

Therefore, a need exists for a technology capable of efficiently scanning storages connected to a mobile communication terminal, and effectively performing share setting on content stored in each of the storages. For example, a need exists for a system and method of sharing content by using a plurality of storages, whereby the plurality of storages that are connected to a mobile communication terminal may be divided according to their attributes, and share setting may be performed on a plurality of content stored in the storages, respectively The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a system and method of sharing content by using a plurality of storages, whereby the plurality of storages that are connected to a mobile communication terminal may be divided according to their attributes, and share setting may be performed on a plurality of content stored in the storages, respectively.

Another aspect of the present invention is to provide a system and method of sharing content by using a plurality of storages, whereby storage lists that are divided according to attributes may be displayed on a plurality of regions of a storage share setting screen, and content share setting may be performed on each of the storage lists.

In accordance with an aspect of the present invention, a system for sharing content by using a plurality of storages is provided. The system includes a plurality of storages connected to a mobile communication terminal, and providing to the mobile communication terminal at least one of content and link information about the content, and the mobile communication terminal generating a storage share setting screen related to sharing of the content stored in the plurality of storages, and sharing content with a display device connected to the mobile communication terminal, wherein the content is stored in a storage that is activated with respect to content sharing in response to a user input via the storage share setting screen, and wherein the mobile communication terminal divides the plurality of storages according to attributes that are previously configured, and differently disposes the plurality of storages that are divided according to the attributes in a plurality of regions on the storage share setting screen.

In accordance with another aspect of the present invention, the mobile communication terminal may generate the storage share setting screen including a storages-list of the plurality of storages, and displays a share setting button so as to separately configure sharing of content in the storages-list.

In accordance with another aspect of the present invention, the mobile communication terminal may activate sharing of content stored in each of the plurality of divided storages, for each of the plurality of divided storages, in response to a user input via the storage share setting screen.

In accordance with another aspect of the present invention, the attributes that are previously configured may be distinguished from each other according to whether a storage is statically connected to the mobile communication terminal or whether a storage is dynamically connected to the mobile communication terminal.

In accordance with another aspect of the present invention, the mobile communication terminal may generate a content-list screen displaying a list of a plurality of content included in the storage that is activated with respect to content sharing and among the plurality of storages, and the mobile communication terminal may select content included in the content-list screen in response to a user input via the content-list screen and may request reproduction of the selected content to the display device that is connected to the mobile communication terminal.

In accordance with another aspect of the present invention, the mobile communication terminal may receive link information corresponding to the selected content from the storage storing the selected content and may provide the link information to the display device.

In accordance with another aspect of the present invention, as the display device reproduces the selected content, the mobile communication terminal may generate a content control screen so as to remotely control the display device.

In accordance with another aspect of the present invention, the mobile communication terminal may generate a play-list screen including a play-list related to a plurality of content that are currently reproduced and that are from among a plurality of content stored in the plurality of storages.

In accordance with another aspect of the present invention, a mobile communication terminal generating a storage share setting screen is provided. The mobile communication terminal includes a storage information collecting unit collecting a plurality of storage information about the plurality of storages connected to the mobile communication terminal, a User Interface (UI) generating unit dividing the plurality of storages according to attributes that are previously configured, based on the plurality of storage information, and generating a storage share setting screen with respect to the plurality of storages, a display unit displaying the storage share setting screen, and a storage setting unit activating sharing of content stored in the plurality of storages, for each of the plurality of storages, in response to a user input via the storage share setting screen, wherein the UI generating unit differently disposes lists of the plurality of storages that are divided according to the attributes in a plurality of regions on the storage share setting screen.

In accordance with another aspect of the present invention, the UI generating unit may generate the storage share setting screen including a storages-list of the plurality of storages and may display a share setting button so as to separately set sharing of content in the storages-list.

In accordance with another aspect of the present invention, the attributes that are previously configured may be distinguished from each other according to whether a storage is statically connected to the mobile communication terminal or whether a storage is dynamically connected to the mobile communication terminal.

In accordance with another aspect of the present invention, the UI generating unit may generate a content-list screen displaying a list of a plurality of content included in the storage that is activated with respect to content sharing among the plurality of storages, and the mobile communication terminal may further include a content reproduction requesting unit for selecting content included in the content-list screen in response to a user input via the content-list screen and for requesting reproduction of the selected content to the display device that is connected to the mobile communication terminal.

In accordance with another aspect of the present invention, the content reproduction requesting unit may receive link information corresponding to the selected content from the storage storing the selected content and may provide the link information to the display device.

In accordance with another aspect of the present invention, as the display device reproduces the selected content, the UI generating unit may generate a content control screen so as to remotely control the display device.

In accordance with another aspect of the present invention, the UI generating unit may generate a play-list screen including a play-list related to a plurality of content that are currently reproduced and that are from among a plurality of content stored in the plurality of storages.

In accordance with another aspect of the present invention, the storage information may include an IDentification (ID) value of the storage, an ID value of content stored in the storage, a type of the storage, and a communication method used between the storage and the mobile communication terminal.

In accordance with another aspect of the present invention, a method of generating a storage share setting screen is provided. The method may be performed by a mobile communication terminal connected with a plurality of storages. The method includes collecting a plurality of storage information about the plurality of storages connected to the mobile communication terminal, dividing the plurality of storages according to attributes that are previously configured, based on the plurality of storage information, generating a storage share setting screen with respect to the plurality of storages, displaying the storage share setting screen, and activating sharing of content stored in the plurality of storages, for each of the plurality of storages, in response to a user input via the storage share setting screen, wherein the operation of generating the storage share setting screen may include an operation of differently disposing the plurality of storages that are divided according to the attributes in a plurality of regions on the storage share setting screen.

In accordance with another aspect of the present invention, the method may further include generating a content-list screen displaying a list of a plurality of content included in the storage that is activated with respect to content sharing among the plurality of storages, selecting content included in the content-list screen in response to a user input via the content-list screen, and requesting reproduction of the selected content to the display device that is connected with the mobile communication terminal.

In accordance with another aspect of the present invention, the operation of requesting the reproduction of the selected content may include receiving link information corresponding to the selected content from the storage storing the selected content, and providing the link information to the display device.

In accordance with another aspect of the present invention, as the display device reproduces the selected content, the method may further include generating a content control screen so as to remotely control the display device.

In accordance with another aspect of the present invention, the method may further include an operation of generating a play-list screen including a play-list related to a plurality of content that are currently reproduced and that are from among a plurality of content stored in the plurality of storages.

In accordance with another aspect of the present invention, the storage information may include an IDentification (ID) value of the storage, an ID value of content stored in the storage, a type of the storage, and a communication method used between the storage and the mobile communication terminal.

In accordance with another aspect of the present invention, a non-transitory computer-readable recording medium having recorded thereon a program for executing the method of generating a storage share setting screen is provided. The method includes collecting a plurality of storage information about the plurality of storages connected to the mobile communication terminal, dividing the plurality of storages according to attributes that are previously configured, based on the plurality of storage information, generating a storage share setting screen with respect to the plurality of storages, displaying the storage share setting screen, and activating sharing of content stored in the plurality of storages, for each of the plurality of storages, in response to a user input via the storage share setting screen. The generating of the storage share setting screen comprises differently disposing the plurality of storages that are divided according to the attributes in a plurality of regions on the storage share setting screen.

In accordance with another aspect of the present invention, a mobile communication terminal is provided. The mobile communication terminal includes a memory storing at least one program, and a processor executing the at least one program, thereby allowing the at least one program to generate a storage share setting screen, wherein the at least one program comprises command codes for executing collecting a plurality of storage information about the plurality of storages connected with to the mobile communication terminal, dividing the plurality of storages according to attributes that are previously set configured, based on the plurality of storage information, generating a storage share setting screen with respect to the plurality of storages, displaying the storage share setting screen; and activating sharing of content stored in the plurality of storages, for each of the plurality of storages, in response to a user input via the storage share setting screen, wherein the generating of the storage share setting screen comprises differently disposing the plurality of storages that are divided according to the attributes in a plurality of regions on the storage share setting screen.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 9 illustrates a device management table, according to an exemplary embodiment of the present invention;

FIG. 10 illustrates a content information cache table, according to an exemplary embodiment of the present invention;

FIG. 13 illustrates a storage setting table, according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the specification, it will also be understood that when an element is referred to as being "connected to" another element, the element can be directly connected to the other element, or the element can be electrically connected to the other element by having intervening elements interposed therebetween. Also, when a part "includes" or "includes" an element, unless there is a particular description contrary thereto, the part can further include other elements, not excluding the other elements.

Expressions such as "at least one of," when preceding a list of elements, modify the entire list of elements and do not modify the individual elements of the list.

Figure 1:
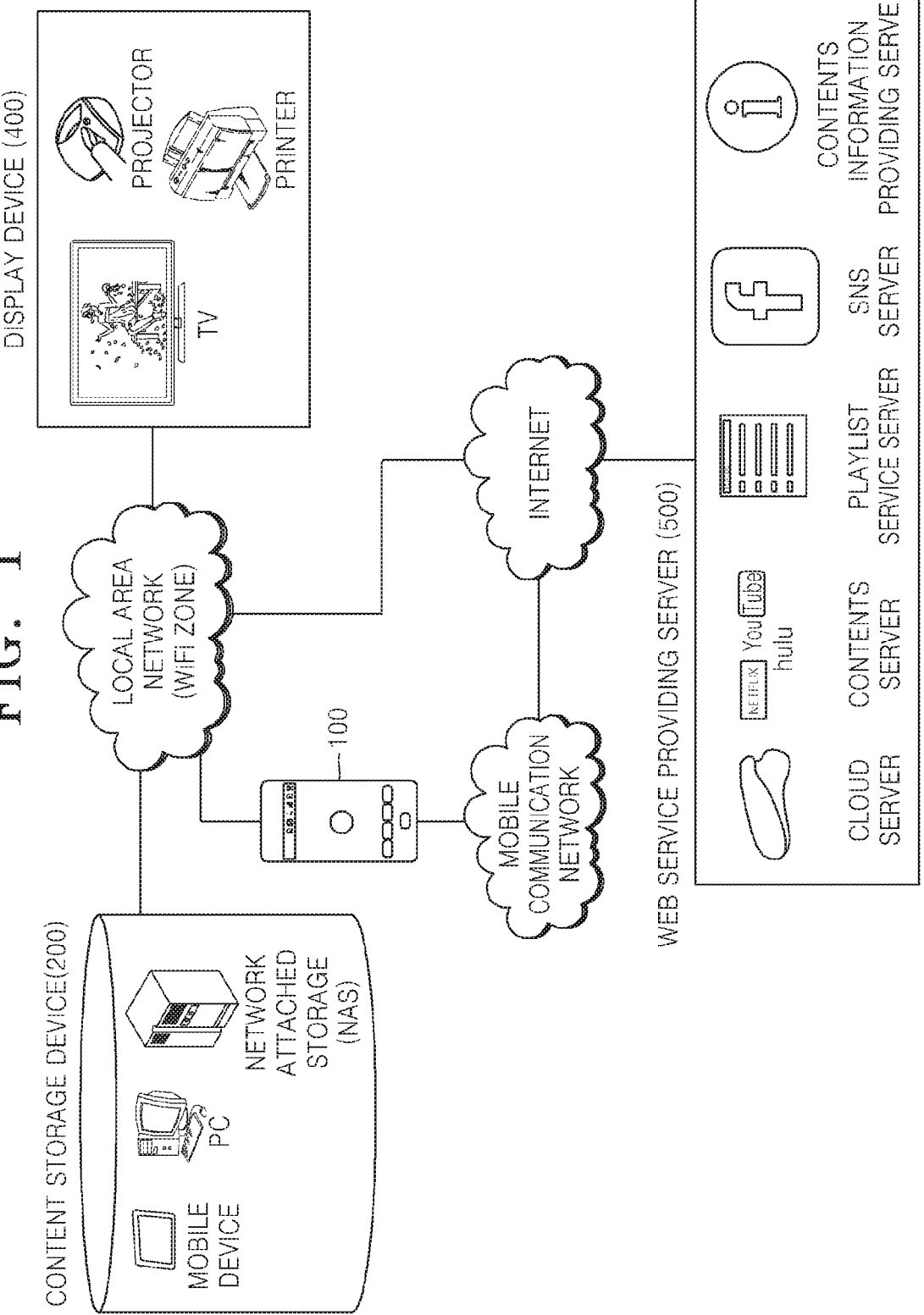
FIG. 1 illustrates a content sharing system using a plurality of storages according to an exemplary embodiment of the present invention.

FIG. 1 illustrates a content sharing system using a plurality of storages according to an exemplary embodiment of the present invention.

Referring to FIG. 1, in the content sharing system, a mobile communication terminal 100 may be connected to a plurality of storages including a content storage device 200 and a web service providing server 500 and may share a plurality of content from the plurality of storages with a display device 400 that is connected to the mobile communication terminal 100.

The plurality of storages may include a device or a server capable of storing content. For example, the plurality of storages may include a Personal Computer (PC), a cloud server, a content providing server, a Social Network Service (SNS) server, an NAS, and other storage devices. Also, the display device 400 may indicate a device capable of reproducing content stored in the plurality of storages and may include at least one of the plurality of storages or may include another device such as a TV, a projector, a tablet Personal Computer (PC), and the like.

The mobile communication terminal 100 may generate and display a storage share setting screen so as to activate sharing of the plurality of content from the plurality of storages that are connected to the mobile communication terminal 100, and a user may set (e.g., configure) whether to activate the plurality of storages by using the storage share setting screen.

The mobile communication terminal 100 may generate and display a content-list screen about the plurality of content from the plurality of storages that are connected to the mobile communication terminal 100. The mobile communication terminal 100 may select predetermined content in response to a user input via the content-list screen, and may request reproduction of the selected content to the display device 400 connected to the mobile communication terminal 100.

The mobile communication terminal 100 may generate a content control screen so as to control content that is being reproduced by the display device 400, and may remotely control the display device 400 in response to a user input via the content control screen.

The mobile communication terminal 100, the content storage device 200, and the display device 400 may be connected via a local network, and the mobile communication terminal 100 and the web service providing server 500 may be connected via a mobile communication network or internet but aspects of the present invention are not limited thereto.

Also, the web service providing server 500 may include a cloud server for storing and managing a plurality of personal content, a content providing server for servicing commercial content, a playlist server for storing and managing playlists of a plurality of content, an SNS server for content-sharing via a social network, and a content information providing server for storing and managing additional information about content.

Figure 2:
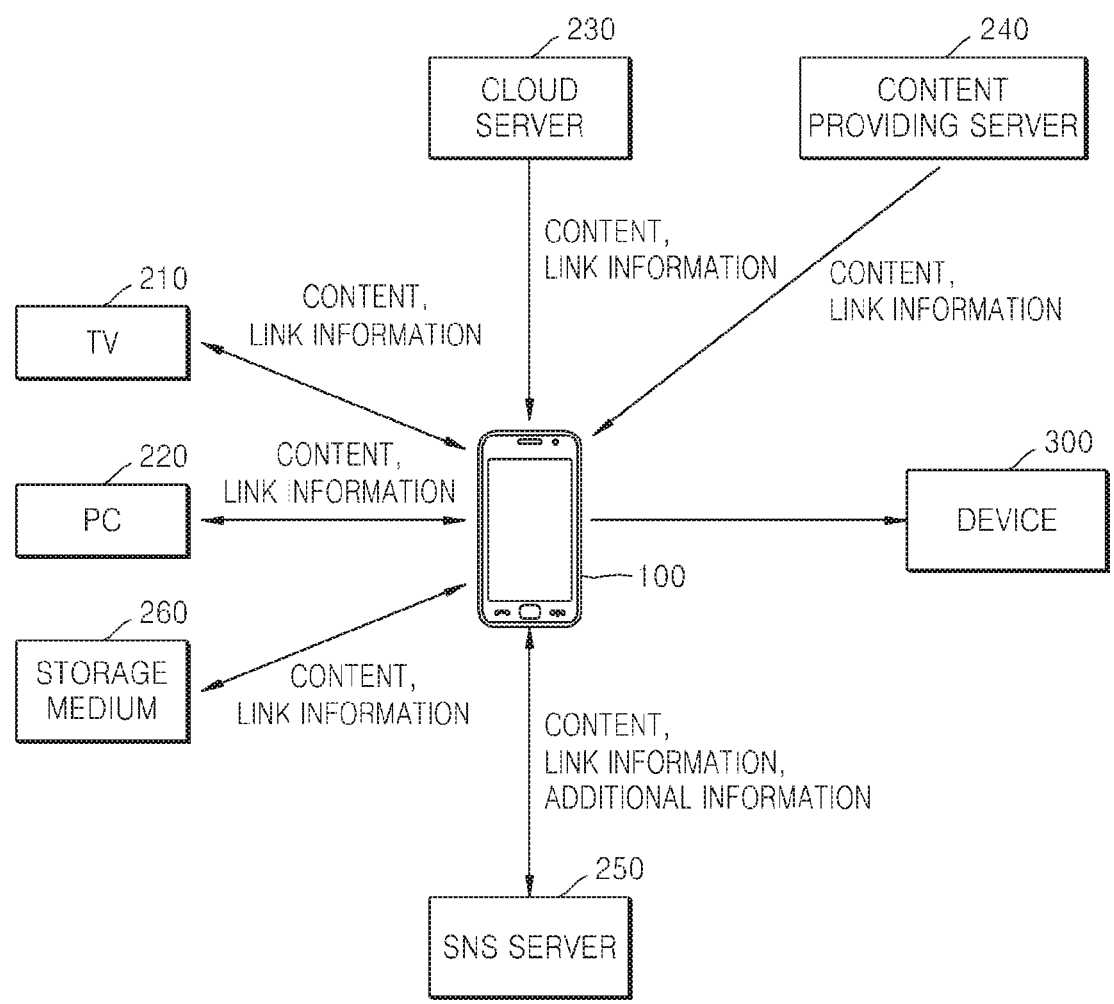
FIG. 2 illustrates an example of a content sharing system using a plurality of storages, according to an exemplary embodiment of the present invention.

FIG. 2 illustrates an example of a content sharing system using a plurality of storages, according to an exemplary embodiment of the present invention.

Referring to FIG. 2, in the content sharing system according to the present exemplary embodiment, the mobile communication terminal 100 may be connected to the plurality of storages and may share a plurality of content, which are stored in the plurality of storages, with a display device connected with the mobile communication terminal 100.

The plurality of storages may include a device or a server capable of storing content. For example, the plurality of storages may include a smart TV 210, a PC 220, a cloud server 230, a content providing server 240, an SNS server 250, and other storage mediums 260. Also, the display device may indicate a device capable of reproducing content stored in the storage, and may include at least one of the plurality of storages or may include another device 300 other than the plurality of storages.

The mobile communication terminal 100 may generate and display a storage share setting screen so as to activate sharing of the plurality of content that are stored in the plurality of storages connected with the mobile communication terminal 100. In this regard, a user may set whether or not to activate each of the plurality of storages, by using the storage share setting screen.

The mobile communication terminal 100 may generate and display a content-list screen related to the plurality of content that are stored in the plurality of storages connected with the mobile communication terminal 100. Also, the mobile communication terminal 100 may select predetermined content in response to a user input via the content-list screen, and may request the display device to reproduce the selected content, wherein the display device is connected with the mobile communication terminal 100.

The mobile communication terminal 100 may generate a content control screen so as to control the content that is being reproduced in the display device, and may remotely control the display device in response to a user input via the content control screen.

Figure 3:
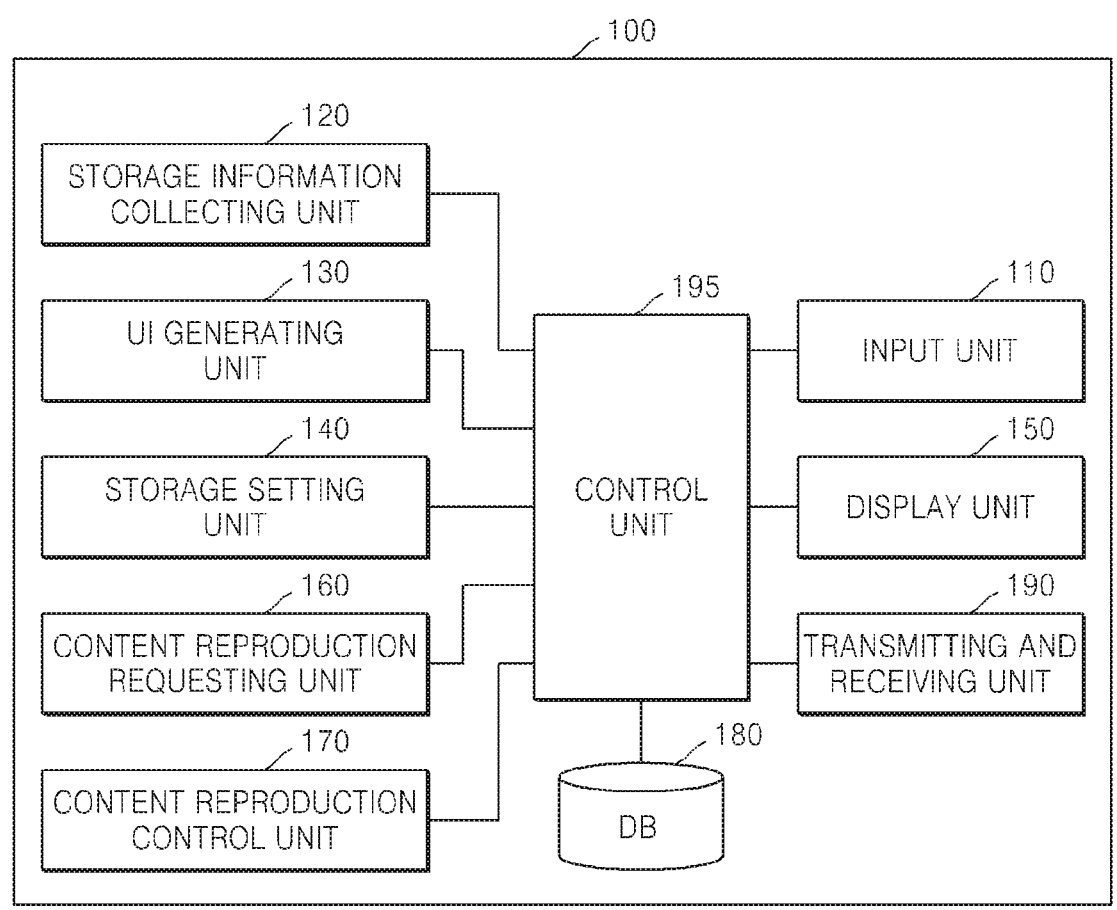
FIG. 3 illustrates in detail a configuration of a mobile communication terminal, according to an exemplary embodiment of the present invention.

FIG. 3 illustrates in detail a configuration of a mobile communication terminal according to an exemplary embodiment of the present invention.

Referring to FIG. 3, the mobile communication terminal 100 includes an input unit 110, a storage information collecting unit 120, a User Interface (UI) generating unit 130, a storage setting unit 140, a display unit 150, a content reproduction requesting unit 160, a content reproduction control unit 170, a DataBase (DB) 180, a transmitting and receiving unit 190, and a control unit 195.

The input unit 110 receives a user input to the mobile communication terminal 100. A user may touch a predetermined position on a screen of the mobile communication terminal 100, and the input unit 110 may receive the user input incurred by the user touch. However, the user input is not limited thereto and thus the input unit 110 may receive the user input via an input tool such as a keyboard, a mouse, a stylus pen, or the like.

The storage information collecting unit 120 receives storage information from the plurality of storages connected with the mobile communication terminal 100. The storage information may be related to one of the plurality of storages and that is connected with the mobile communication terminal 100 and may include an IDentification (ID) value of the storage, an ID value of content stored in the storage, a type of the storage, an ID value of content reproduced in the storage, and a communication method used between the storage and the mobile communication terminal 100.

When a network communication function that is previously set in the mobile communication terminal 100 is activated, the storage information collecting unit 120 may scan a storage that is connectable to the mobile communication terminal 100 and may collect storage information from the scanned storage. For example, as a Wi-Fi communication function is activated in the mobile communication terminal 100, the storage information collecting unit 120 may scan a storage that is connectable to the mobile communication terminal 100.

The UI generating unit 130 generates a storage share setting screen based on the storage information. The storage share setting screen may be used whether or not to allow the mobile communication terminal 100 and a display device to share content stored in the storage. The UI generating unit 130 may distinguish between the plurality of storages connected with the mobile communication terminal 100, according to storage ID values, and may differently dispose the plurality of storages in a plurality of regions on the storage share setting screen.

The UI generating unit 130 generates a content-list screen for displaying a list of a plurality of content stored in the storage, based on the storage information. The UI generating unit 130 may recognize a plurality of content stored in the plurality of storages, respectively, based on a plurality of storage information, and may generate the content-list screen by differently arraying a list of the plurality of content for each of the plurality of storages.

The UI generating unit 130 generates a play-list screen including a play-list related to a plurality of content that are currently reproduced or previously reproduced, based on the storage information. The plurality of content may be reproduced by the smart TV 210, the PC 220, or the like which is a storage having a display function, or by the other device 300 connected with the mobile communication terminal 100.

The UI generating unit 130 generates a content control screen so as to facilitate control of content reproduction in the mobile communication terminal 100 or other display device. The UI generating unit 130 may separately generate a content control screen so as to facilitate control of content reproduced in the mobile communication terminal 100, and a content control screen so as to facilitate control of content reproduced in the other display device 300.

The storage share setting screen, the content-list screen, the play-list screen, and the content control screen will be described in detail with reference to FIGS. 11 through 16.

The storage setting unit 140 may set whether to active sharing of content stored in each of the plurality of storages, in response to a user input via the storage share setting screen. The storage share setting screen may include a storages-list with respect to the plurality of storages, and the storages-list may include buttons (or other means for input) used to set sharing of content. The user may select one of the buttons in the storages-list by clicking or touching the button, and by doing so, the user may decide whether to share the content stored in each of the plurality of storages.

The display unit 150 displays the storage share setting screen, the content-list screen, the play-list screen, and the content control screen which are generated by the UI generating unit 130.

The content reproduction requesting unit 160 requests a display device to reproduce content stored in one of the plurality of storages. The content reproduction requesting unit 160 may receive content selected from the content-list screen or may receive link information about the selected content from a storage that stores the selected content. Further, the content reproduction requesting unit 160 may provide the received content or the link information about the selected content to the display device and may request the display device to reproduce the selected content. In addition, the content reproduction requesting unit 160 may request the control unit 195 for content reproduction so as to allow the selected content to be reproduced by the mobile communication terminal 100. In this case, the control unit 195 may execute a predetermined application in the mobile communication terminal 100, thereby reproducing the selected content.

The content reproduction control unit 170 controls content reproduction in response to a user input via the content control screen. The content control screen may be divided into a screen used to control content reproduced by the mobile communication terminal 100, and a screen used to remotely control content reproduced by the display device. When a user input is received via the content control screen so as to control content reproduction in the display device, the content reproduction control unit 170 may generate a predetermined control command based on the user input and may provide the generated control command to the display device.

The DB 180 stores various types of information required for the mobile communication terminal 100 to share content stored in the plurality of storages with the display device. The DB 180 may store, among other items, a plurality of storage information collected from the plurality of storages, and a share setting value for each of the plurality of storages.

The transmitting and receiving unit 190 transmits and receives the various types of information with the plurality of storages and the display device, wherein the various types of information are required for sharing of content stored in the plurality of storages.

The control unit 195 controls all operations of the mobile communication terminal 100. For example, the control unit 195 controls the input unit 110, the storage information collecting unit 120, the UI generating unit 130, the storage setting unit 140, the display unit 150, the content reproduction requesting unit 160, the content reproduction control unit 170, the DB 180, and the transmitting and receiving unit 190, so that the mobile communication terminal 100 may receive the plurality of storage information from the plurality of storages, may generate the storage share setting screen, the content-list screen, the play-list screen, and the content control screen, and may share content.

Figure 4:
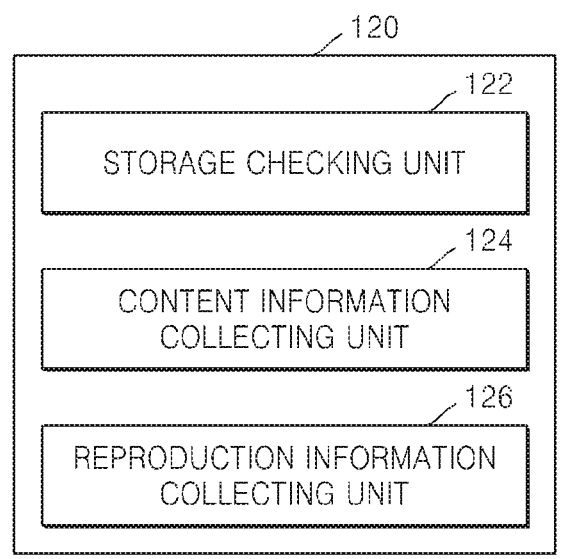
FIG. 4 illustrates in detail a configuration of a storage information collecting unit, according to an exemplary embodiment of the present invention.

FIG. 4 illustrates in detail a configuration of a storage information collecting unit, according to an exemplary embodiment of the present invention.

Referring to FIG. 4, the storage information collecting unit 120 includes a storage checking unit 122, a content information collecting unit 124, and a reproduction information collecting unit 126.

The storage checking unit 122 checks (e.g., analyzes) an ID value of each of a plurality of storages, a type of each storage, and a communication method used between each storage and the mobile communication terminal 100. The plurality of storages connected with the mobile communication terminal 100 may indicate devices capable of storing content and may include, but not limited thereto, a PC, a smart TV, a tablet PC, an SNS server, and a content providing server. In addition, the plurality of storages and the mobile communication terminal 100 may be connected to each other via various types of wired or wireless networks.

The content information collecting unit 124 collects information about content stored in each of the plurality of storages from the plurality of storages. The content information collecting unit 124 may receive an ID value of the content and type information about the content from each of the plurality of storages.

The reproduction information collecting unit 126 collects a plurality of information about a plurality content that are reproduced in the plurality of storages. The reproduction information collecting unit 126 may receive an ID value of content that is reproduced in each of the plurality of storages from each of the plurality of storages. Further, the reproduction information collecting unit 126 may collect information about content that is reproduced in the display device. When the mobile communication terminal 100 provides the display device with content stored in predetermined storage or link information about the content, the display device may reproduce the corresponding content. In addition, the reproduction information collecting unit 126 may collect an ID value corresponding to the content or the link information about the content, which is provided to the display device.

Figure 5:
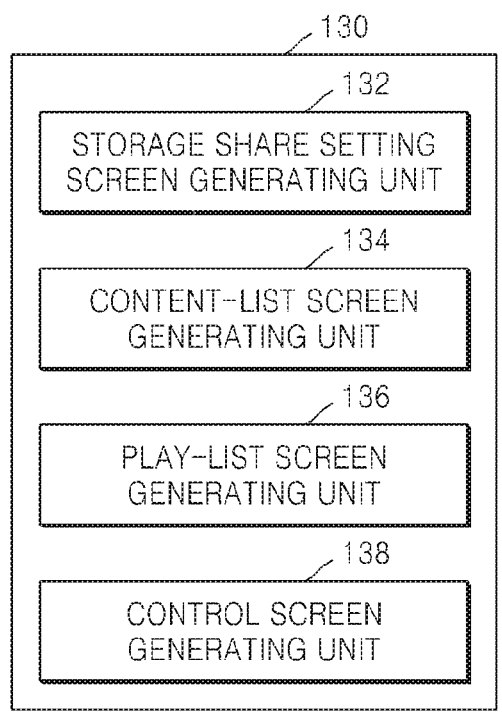
FIG. 5 illustrates in detail a configuration of a User Interface (UI) generating unit, according to an exemplary embodiment of the present invention.

FIG. 5 illustrates in detail a configuration of the UI generating unit, according to an exemplary embodiment of the present invention.

Referring to FIG. 5, the UI generating unit 130 includes a storage share setting screen generating unit 132, a content-list screen generating unit 134, a play-list screen generating unit 136, and a control screen generating unit 138.

The storage share setting screen generating unit 132 generates a storage share setting screen based on storage information. The storage share setting screen generating unit 132 may generate the storage share setting screen including a storages-list of a plurality of storages. Also, the storage share setting screen generating unit 132 may divide the plurality of storages according to attributes and may differently dispose storage lists of the plurality of divided storages in a plurality of regions on the storage share setting screen. For example, the plurality of storages may be divided into a static storage and a dynamic storage. The static storage may indicate a storage whose connection with the mobile communication terminal 100 is recognized as a default, without a separate scanning operation. The dynamic storage may indicate a storage that is scanned by the mobile communication terminal 100 when the storage share setting screen is generated.

As an example, the static storage may include, but not limited thereto, an SNS server and a cloud server. The dynamic storage may include, but not limited thereto, a PC of another user, a storage medium of another user, and a camera of a user. Also, the user may register various storage devices to the static storage and or the dynamic storage via a separate setting procedure.

Attributes of the plurality of storages may be divided according to communication methods with respect to the mobile communication terminal 100. For example, the plurality of storages may be divided into storages that are connected with the mobile communication terminal 100 via a local network and storages that are connected with the mobile communication terminal 100 via an external broadband network. As another example, the plurality of storages may be divided into storages that are connected with the mobile communication terminal 100 via an Access Point (AP) and storages that are connected with the mobile communication terminal 100 via a web.

The storages-list included in the storage share setting screen may include predetermined regions for setting of content sharing. For example, the storages-list may include share setting buttons used to set content sharing.

The share setting button may be a toggle-type button. In this regard, a user may select one of the share setting buttons and then may change an ON or OFF status, so that the user may activate or deactivate sharing of content stored in a storage that corresponds to the selected share setting button.

The storages-list included in the storage share setting screen may include a plurality of pieces of information about positions of the plurality of storages. Names of the plurality of storages included in the storages-list may be changed based on a user input.

The content-list screen generating unit 134 generates a content-list screen including a content-list of content stored in a storage that is activated with respect to content sharing. The content-list screen may include the content-list of a plurality of content, and the content-list may include for each of the plurality of content a title of the content, a type of the content, a reproduction time of the content, and an ID value of the storage that stores the content. In addition, the content-list may display a predetermined icon, and the displayed icon may be used to indicate whether content that corresponds to the content-list is being reproduced by at least one of the storage, the mobile communication terminal 100, and the display device.

The play-list screen generating unit 136 generates a play-list screen including a play-list of one or more content that is currently reproduced or previously reproduced. The play-list screen may display the play-list of the one or more content that are currently reproduced or previously reproduced by at least one of the storage, the mobile communication terminal 100, and the display device. The play-list screen may display the play-list and may display an ID value of a user who provides the play-list, an ID value of a storage that stores content included in the play-list, and the like. Also, the play-list may display pre-set images according to types of the plurality of storages, respectively. For example, when a storage from among the plurality of storages is a mobile communication terminal of a friend of the user (or other known contact), the play-list may display a picture of the friend, and when the storage is an SNS server, the play-list may display a group image indicating a group that includes the user.

The control screen generating unit 138 generates a content control screen used to control content reproduction. The content control screen may be divided into a control screen used to control content that is reproduced by the mobile communication terminal 100 and a control screen used to control content that is reproduced by another display device. When a predetermined icon is selected on the content control screen, a selection window that allows selection of a display device may be displayed in order to allow the content to be reproduced by the other display device.

Figure 6:
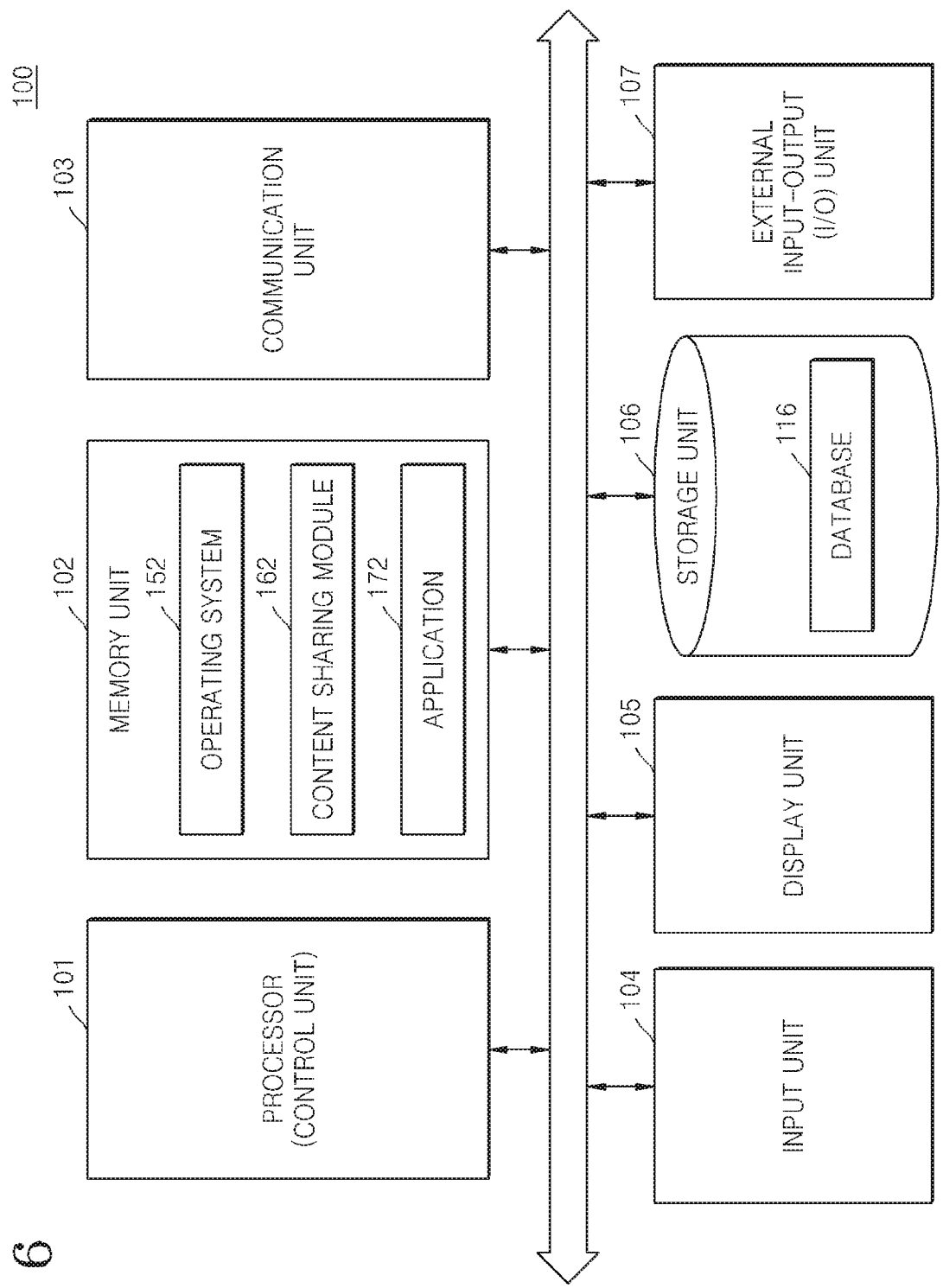
FIG. 6 illustrates in detail a configuration of a mobile communication terminal, according to an exemplary embodiment of the present invention.

FIG. 6 illustrates in detail a configuration of a mobile communication terminal, according to an exemplary embodiment of the present invention.

Referring to FIG. 6, the mobile communication terminal 100 includes a processor 101, a memory unit 102, a communication unit 103, an input unit 104, a display unit 105, a storage unit 106, and an external Input-Output (I/O) unit 107.

The memory unit 102 includes an Operating System (OS) 152, a content sharing module 162, and an application 172.

The storage unit 106 includes a DB 116.

The processor 101 controls all operations of the mobile communication terminal 100. For example, the processor 101 controls the memory unit 102, the communication unit 103, the input unit 104, the display unit 105, the storage unit 106, and the external I/O unit 107 so that the mobile communication terminal 100 may receive storage information from the plurality of storages, may generate the storage share setting screen, the content-list screen, the play-list screen, and the content control screen, and may share content.

In addition, the processor 101 may control the operations of the mobile communication terminal 100 by using the OS 152, the content sharing module 162, and the application 172 of the memory unit 102, and may share content with various storages, a web service providing server, and a display device which are connected with the mobile communication terminal 100, by using the content sharing module 162.

The content sharing module 162 of the memory unit 102 may set sharing of content with the various storages, the web service providing server, and the display device which are connected with the mobile communication terminal 100. Further, the content sharing module 162 may control power of the various storages, the web service providing server, and the display device which are connected with the mobile communication terminal 100. In addition, the content sharing module 162 may share additional information about the content with the various storages, the web service providing server, and the display device which are connected with the mobile communication terminal 100.

The content sharing module 162 may store and manage a plurality of state information about the various storages, the web service providing server, and the display device which are connected with the mobile communication terminal 100, and may store information about the content in a cache memory (not shown).

The content sharing module 162 may share and reproduce content via a Digital Living Network Alliance (DLNA). The content sharing module 162 may search for services that are provided by devices and apparatuses on a network and may use a Universal Plug and Play (UPnP) technology and a Bonjour technology.

A configuration of the content sharing module 162 will be described in detail with reference to FIG. 7.

The input unit 104 receives a user input to the mobile communication terminal 100. A user may touch a predetermined position on a screen of the mobile communication terminal 100, and then the input unit 104 may receive the user input caused by the user touch. However, the user touch is not limited thereto and thus the input unit 104 may receive the user touch caused by an input tool such as a keyboard, a mouse, a stylus pen, or the like.

The display unit 105 displays various UIs used to share content, and the content. The display unit 105 may display, but not limited thereto, the storage share setting screen, the content-list screen, the play-list screen, and the content control screen.

The storage unit 106 stores various types of information used to share content. The storage unit 106 may include the DB 116. The DB 116 will be described in detail with reference to FIG. 8.

Figure 7:
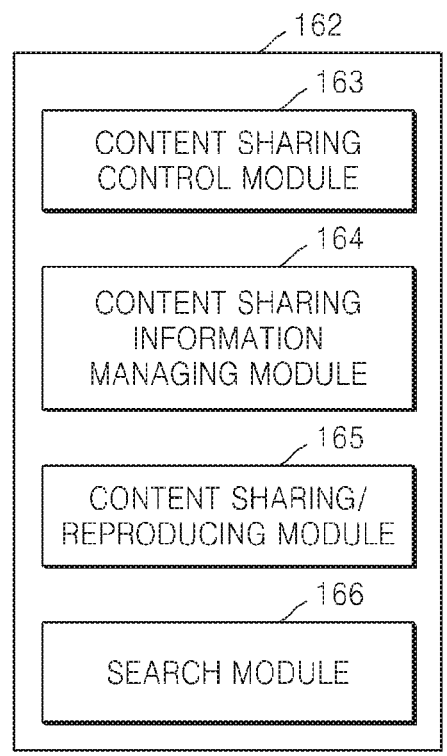
FIG. 7 illustrates in detail a configuration of a content sharing module, according to an exemplary embodiment of the present invention.

FIG. 7 illustrates in detail a configuration of a content sharing module, according to an exemplary embodiment of the present invention.

Referring to FIG. 7, the content sharing module 162 includes a content sharing control module 163, a content sharing information managing module 164, a content sharing/reproducing module 165, and a search module 166.

The content sharing control module 163 may share content with a storage, a web service providing server, and a display device which are connected with the mobile communication terminal 100. Further, the content sharing control module 163 may control power of the storage, the web service providing server, and the display device which are connected with the mobile communication terminal 100. In addition, the content sharing control module 163 may share additional information about content with the storage, the web service providing server, and the display device which are connected with the mobile communication terminal 100.

The content sharing control module 163 may generate a storage share setting screen. The storage share setting screen may be used whether to allow the mobile communication terminal 100 and the display device to share the content stored the storage. The content sharing control module 163 may distinguish between a plurality of storages connected with the mobile communication terminal 100, according to storage ID values, and may differently dispose the plurality of storages in a plurality of regions on the storage share setting screen, respectively.

The content sharing control module 163 generates a content-list screen displaying a plurality of content that are stored in the plurality of storages, based on storage information. The content sharing control module 163 may check (e.g., analyze) the plurality of content that are stored in the plurality of storages, respectively, based on the storage information, and may generate the content-list screen by differently arraying a list of the plurality of content for each of the plurality of storages.

The content sharing control module 163 generates a play-list screen including a play-list related to a plurality of content that are currently reproduced or previously reproduced, based on the storage information. The plurality of content may be reproduced by the smart TV 210, the PC 220, or the like which is a storage having a display function, or by the other device 300 connected with the mobile communication terminal 100.

The content sharing control module 163 generates a content control screen so as to control content reproduction in the mobile communication terminal 100 or other display device. The content sharing control module 163 may separately generate a content control screen so as to control content reproduced in the mobile communication terminal 100, and a content control screen so as to control content reproduced in the other display device.

The content sharing control module 163 may set (e.g., configure) whether to activate (or allow) sharing of content stored in each of the plurality of storages, in response to a user input via the storage share setting screen. The storage share setting screen may include a storages-list with respect to the plurality of storages, and the storages-list may include buttons (or other input means) used to set sharing of content. The user may select one of the buttons in the storages-list by clicking or touching the button, and by doing so, the user may decide whether to share the content stored in each of the plurality of storages.

The content sharing control module 163 generates the storage share setting screen based on the storage information. The content sharing control module 163 may generate the storage share setting screen including a storages-list of the plurality of storages. The content sharing control module 163 may divide the plurality of storages according to attributes and may differently dispose storage lists of the plurality of divided storages in a plurality of regions on the storage share setting screen.

For example, the plurality of storages may be divided into a static storage and a dynamic storage. The static storage may indicate a storage whose connection with the mobile communication terminal 100 is recognized as a default, without a separate scanning operation. The dynamic storage may indicate a storage that is scanned by the mobile communication terminal 100 when the storage share setting screen is generated.

As another example, the static storage may include, but not limited thereto, an SNS server and a cloud server, and the dynamic storage may include, but not limited thereto, a PC of another user, a storage medium of another user, and a camera of a user. The user may register various storage devices to the static storage and or the dynamic storage via a separate setting procedure.

Attributes of the plurality of storages may be divided according to communication methods with respect to the mobile communication terminal 100. For example, the plurality of storages may be divided into storages that are connected with the mobile communication terminal 100 via a local network and storages that are connected with the mobile communication terminal 100 via an external broad network. As another example, the plurality of storages may be divided into storages that are connected with the mobile communication terminal 100 via an Access Point (AP) and storages that are connected with the mobile communication terminal 100 via a web (e.g., Internet).

The storages-list included in the storage share setting screen may include predetermined regions for setting of content sharing. For example, the storages-list may include buttons used to set (e.g., configure) content sharing.

The share setting button may be a toggle-type button. In this regard, a user may select one of the share setting buttons and then may change an ON or OFF status, so that the user may activate or deactivate sharing of content stored in a storage that corresponds to the selected share setting button.

The storages-list included in the storage share setting screen may include a plurality of information about positions of the plurality of storages. Names of the plurality of storages included in the storages-list may be changed based on a user input.

The content sharing control module 163 generates a content-list screen including a content-list of content stored in a storage that is activated with respect to content sharing. The content-list screen may include the content-list of a plurality of content, and the content-list may include a title of content, a type of the content, a reproduction time of the content, and an ID value of the storage that stores the content. The content-list may display a predetermined icon, and the displayed icon may be used to indicate whether content that corresponds to the content-list is being reproduced by at least one of the storage, the mobile communication terminal 100, and the display device.

The content sharing control module 163 generates a play-list screen including a play-list related to a plurality of content that are currently reproduced or previously reproduced. The play-list screen may display the play-list of the one or more content that are currently reproduced or previously reproduced by at least one of the storage, the mobile communication terminal 100, and the display device. The play-list screen may display the play-list and may display an ID value of a user who provides the play-list, an ID value of a storage that stores content included in the play-list, and the like. In addition, the play-list may display pre-set images according to types of the plurality of storages, respectively. For example, when a storage from among the plurality of storages is a mobile communication terminal of a friend of the user (or other known contact), the play-list may display a picture of the friend, and when the storage is an SNS server, the play-list may display a group image indicating a group that includes the user.

The content sharing control module 163 generates a content control screen used to control content reproduction. The content control screen may be divided into a control screen used to control content that is reproduced by the mobile communication terminal 100 and a control screen used to control content that is reproduced by another display device. When a predetermined icon is selected on the content control screen, a selection window that allows selection of a display device may be displayed in order to allow the content to be reproduced by the other display device.

The content sharing information managing module 164 may store and manage a plurality of state information about the plurality of storages, the web service providing server, and the display device which are connected with the mobile communication terminal 100, and may store information about the content in a cache memory (not shown).

The content sharing information managing module 164 receives storage information from the plurality of storages connected with the mobile communication terminal 100. The storage information may be related to one of the plurality of storages that is connected with the mobile communication terminal 100 and may include an ID value of the storage, an ID value of content stored in the storage, a type of the storage, an ID value of content reproduced in the storage, and a communication method used between the storage and the mobile communication terminal 100.

The content sharing information managing module 164 may store ID values, types of the storage, and communications methods with respect to the storage, the web service providing server, and the display device which are connected with the mobile communication terminal 100. The plurality of storages connected with the mobile communication terminal 100 may indicate devices capable of storing content and may include, but not limited thereto, PCs, smart TVs, tablet PCs, SNS servers, and content providing servers. The plurality of storages and the mobile communication terminal 100 may be connected to each other via various types of wired or wireless networks. The content sharing information managing module 164 may store, among other items, a plurality of storage information collected from the plurality of storages, and a share setting value for each of the plurality of storages.

The content sharing information managing module 164 collects information about content stored in each of the plurality of storages from the plurality of storages. The content sharing information managing module 164 may receive an ID value of the content and type information about the content from each of the plurality of storages.

The content sharing information managing module 164 collects a plurality of information about a plurality of content that are reproduced in the plurality of storages. The content sharing information managing module 164 may receive an ID value of content that is reproduced in each of the plurality of storages from each of the plurality of storages. Further, the content sharing information managing module 164 may collect information about content that is reproduced in the display device. When the mobile communication terminal 100 provides the display device with content stored in predetermined storage or link information about the content, the display device may reproduce the corresponding content. In addition, the content sharing information managing module 164 may collect an ID value corresponding to the content or the link information about the content, which is provided to the display device.

The content sharing/reproducing module 165 may share content with the storage, the web service providing server, and the display device which are connected with the mobile communication terminal 100. The content sharing/reproducing module 165 may share and reproduce content via a DLNA.

The content sharing/reproducing module 165 requests a display device to reproduce content stored in one of the plurality of storages. The content sharing/reproducing module 165 may receive content selected from the content-list screen or may receive link information about the selected content from a storage that stores the selected content. The content sharing/reproducing module 165 may provide the received content or the link information about the selected content to the display device and may request the display device to reproduce the selected content.

The content sharing/reproducing module 165 controls content reproduction in response to a user input via the content control screen. The content control screen may be divided into a screen used to control content reproduced by the mobile communication terminal 100, and a screen used to remotely control content reproduced by the display device. When a user input is received via the content control screen so as to control content reproduction in the display device, the content sharing/reproducing module 165 may generate a predetermined control command based on the user input and may provide the generated control command to the display device.

The search module 166 searches for the storage, the web service providing server, and the display device which are connected with the mobile communication terminal 100. When a network communication function that is previously set in the mobile communication terminal 100 is activated, the search module 166 may scan a storage that is connectable to the mobile communication terminal 100. For example, as a Wi-Fi communication function is activated in the mobile communication terminal 100, the search module 166 may scan a storage that is connectable to the mobile communication terminal 100.

Figure 8:
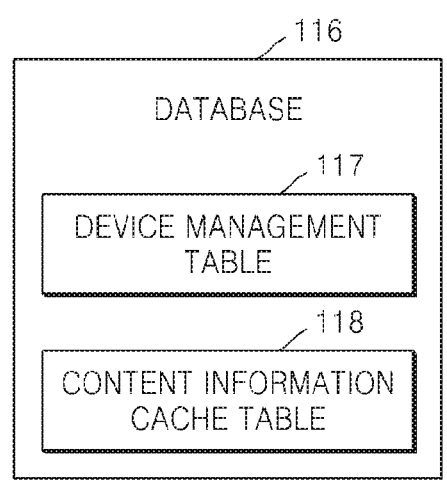
FIG. 8 illustrates in detail a configuration of a DataBase (DB), according to an exemplary embodiment of the present invention.

FIG. 8 illustrates in detail a configuration of the DB, according to an embodiment of the present invention. FIG. 9 illustrates a device management table, according to an exemplary embodiment of the present invention.

Referring to FIG. 8, the DB 116 may store a device management table 117 and a content information cache table 118.

Referring to FIGS. 8 and 9, the device management table 117 may include an ID field 900, a device display name field 902, a device name 904, a type field 906, an attribute field 908, a share setting field 910, an access key field 912, a recently reproduced-content key field 914, a zone address field 916, a device address field 918, a MAC address field 920, and a cache content group ID field 922.

The device display name field 902 includes a name of a device to be displayed on a screen of the mobile communication terminal 100, and the device name 904 includes a name of a device that is scanned by the mobile communication terminal 100. The type field 906 includes a type of a device, and the attribute field 908 includes an attribute value of a device. The share setting field 910 includes information relating to whether sharing is activated. The recently reproduced-content key field 914 includes an ID value of content that is recently reproduced, and the zone address field 916 includes an MAC address of an AP. The device address field 918 includes an address value (e.g., URL, IP, or the like) of a device, and the MAC address field 920 includes an MAC address of a device. The cache content group ID field 922 includes IDs of groups that match with devices, respectively.

FIG. 10 illustrates a content information cache table, according to an exemplary embodiment of the present invention.

Referring to FIG. 10, recently reproduced-content or a search result may be cached and recorded to the content information cache table 118 so that the search result may be rapidly provided to a user. The content information cache table 118 may include a KEY field, a Group ID field, a Title field, a Played Position field, an URI field, an Author field, a Type field, a favorite field, a Like field, and a Total Time field.

Figure 11:
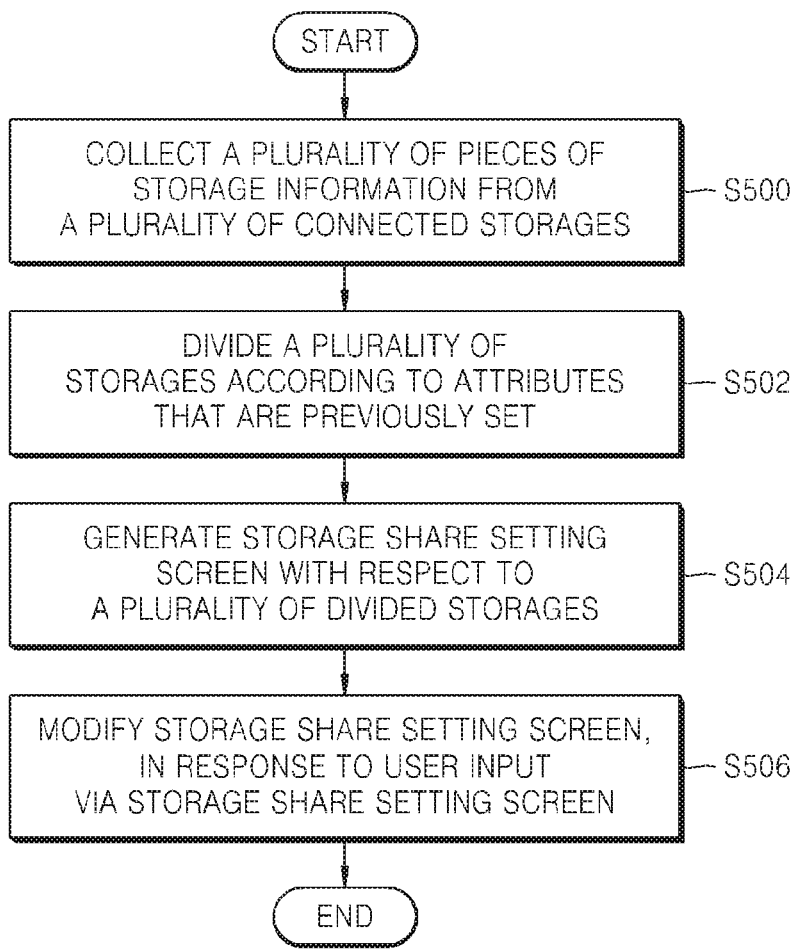
FIG. 11 is a flowchart of a method of generating, by a mobile communication terminal, a storage share setting screen about a plurality of storages connected with the mobile communication terminal, according to an exemplary embodiment of the present invention.

FIG. 11 is a flowchart of a method of generating, by a mobile communication terminal, a storage share setting screen about a plurality of storages connected with the mobile communication terminal, according to an exemplary embodiment of the present invention.

Referring to FIG. 11, in operation S500, the mobile communication terminal 100 collects a plurality of storage information from the plurality of storages connected with the mobile communication terminal 100. The plurality of storages connected with the mobile communication terminal 100 may include, but not limited to, a PC, a smart TV, a tablet PC, an SNS server, and a content providing server. The plurality of storages and the mobile communication terminal 100 may be connected to each other via various types of wired or wireless networks.

The storage information may be related to a storage that is from among the plurality of storages and that is connected with the mobile communication terminal 100 and may include a ID value of the storage, an ID value of content stored in the storage, a type of the storage, an ID value of content reproduced in the storage, and a communication method used between the storage and the mobile communication terminal 100.

In operation S500, when a network communication function that is previously set in the mobile communication terminal 100 is activated, the mobile communication terminal 100 may scan a storage that is connectable to the mobile communication terminal 100 and may collect storage information from the scanned storage. For example, as a Wi-Fi communication function is activated in the mobile communication terminal 100, the storage information collecting unit 120 may scan a storage that is connectable to the mobile communication terminal 100.

In operation S502, the mobile communication terminal 100 divides the plurality of storages according to attributes that are previously set. In operation S502, the mobile communication terminal 100 may divide the plurality of storages into a static storage and a dynamic storage. The static storage may indicate a storage whose connection with the mobile communication terminal 100 is recognized as a default, without a separate scanning operation. The dynamic storage may indicate a storage that is scanned by the mobile communication terminal 100 when the storage share setting screen is generated. As an example, the static storage may include, but not is limited to, an SNS server and a cloud server, and the dynamic storage may include a PC of another user, a storage medium of another user, a camera of a user, and the like. Also, a user may register various storage devices to the static storage and or the dynamic storage via a separate setting procedure.

The mobile communication terminal 100 may divide the plurality of storages according to communication methods with respect to the mobile communication terminal 100. For example, the plurality of storages may be divided into storages that are connected with the mobile communication terminal 100 via a local network and storages that are connected with the mobile communication terminal 100 via an external broad network. As another example, the plurality of storages may be divided into storages that are connected with the mobile communication terminal 100 via an AP and storages that are connected with the mobile communication terminal 100 via a WEB.

In operation S504, the mobile communication terminal 100 generates a storage share setting screen with respect to the plurality of divided storages. In operation S504, the mobile communication terminal 100 may differently dispose storage lists of the plurality of storages in a plurality of regions on the storage share setting screen, wherein the plurality of storages are divided according to the storage information. Each of the storage lists of the plurality of storages on the storage share setting screen may include a share setting button. The storage lists of the plurality of storages on the storage share setting screen may include a plurality of information about positions of the plurality of storages.

In operation S506, the mobile communication terminal 100 modifies the storage share setting screen, in response to a user input via the storage share setting screen. A user may select one of the share setting buttons in the storage lists by clicking or touching the share setting button, and in response to the user input, the mobile communication terminal 100 may decide whether to share the content stored in each of the plurality of storages and then may modify the storage share setting screen. For example, the share setting button may be a toggle-type button.

A user may select one of the share setting buttons and then may change an ON or OFF status of the selected share setting button, so that the user may activate or deactivate sharing of content stored in a storage that corresponds to the selected share setting button. Names of the plurality of storages included in the storage lists may be changed based on a user input.

Figure 12:
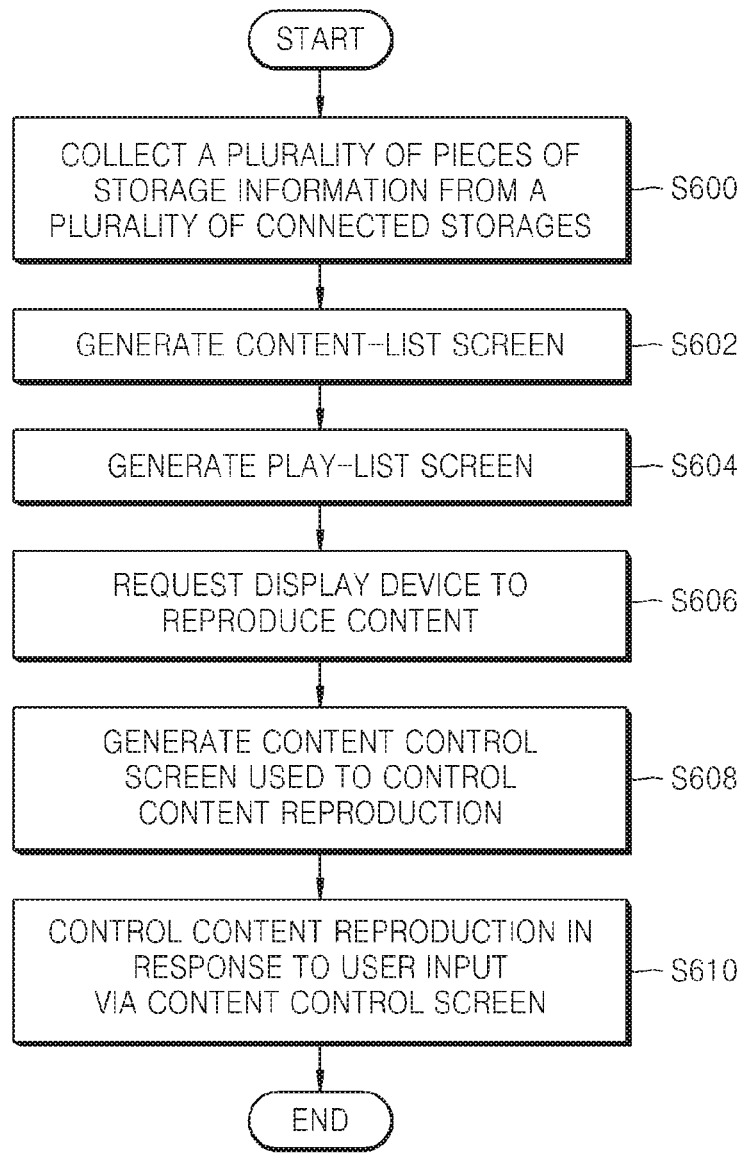
FIG. 12 is a flowchart of a method of sharing, by a mobile communication terminal, content with a display device, according to an exemplary embodiment of the present invention.

FIG. 12 is a flowchart of a method of sharing, by a mobile communication terminal, content with a display device, according to an exemplary embodiment of the present invention.

In operation S600, the mobile communication terminal 100 collects a plurality of storage information from a plurality of storages connected with the mobile communication terminal 100.

The storage information may be related to a storage that is from among the plurality of storages and that is connected with the mobile communication terminal 100 and may include a ID value of the storage, an ID value of content stored in the storage, a type of the storage, an ID value of content reproduced in the storage, and a communication method used between the storage and the mobile communication terminal 100. In more detail, the mobile communication terminal 100 may collect information about content stored in each of the plurality of storages from the plurality of storages. The mobile communication terminal 100 may receive an ID value of the content and type information about the content from each of the plurality of storages. The mobile communication terminal 100 may collect a plurality of information about a plurality of content that are reproduced in the plurality of storages. The mobile communication terminal 100 may receive an ID value of content that is reproduced in each of the plurality of storages from each of the plurality of storages. The mobile communication terminal 100 may collect information about content that is reproduced in the display device. When the mobile communication terminal 100 provides the display device with content stored in predetermined storage or link information about the content, the display device may reproduce the corresponding content. The mobile communication terminal 100 may collect an ID value corresponding to the content or the link information about the content, which is provided to the display device.

In operation S602, the mobile communication terminal 100 generates a content-list screen including a content-list of content stored in a storage that is activated with respect to content sharing. The content-list screen may include the content-list of a plurality of content, and the content-list may include a title of content, a type of the content, a reproduction time of the content, and an ID value of the storage that stores the content. The content-list may display a predetermined icon, and the displayed icon may be used to indicate whether content that corresponds to the content-list is being reproduced by at least one of the storage, the mobile communication terminal 100, and the display device.

In operation S604, the mobile communication terminal 100 generates a play-list screen including a play-list of one or more content that are reproduced. The play-list screen may display the play-list of the one or more content that are currently reproduced or previously reproduced by at least one of the storage, the mobile communication terminal 100, and the display device. The play-list screen may display the play-list and may display an ID value of a user who provides the play-list, an ID value of a storage that stores content included in the play-list, and the like. The play-list may display pre-set images according to types of the plurality of storages, respectively. For example, when a storage from among the plurality of storages is a mobile communication terminal of a friend of the user, the play-list may display a picture of the friend, and when the storage is an SNS server, the play-list may display a group image indicating a group that includes the user.

In operation S606, the mobile communication terminal 100 requests a display device to reproduce content. The mobile communication terminal 100 requests the display device to reproduce the content stored in a storage from among the plurality of storages. The mobile communication terminal 100 may receive content selected from the content-list screen or may receive link information about the selected content from a storage that stores the selected content. The mobile communication terminal 100 may provide the received content or the link information about the selected content to the display device and may request the display device to reproduce the selected content. The mobile communication terminal 100 may reproduce the selected content. In this case, the mobile communication terminal 100 may execute a predetermined application in the mobile communication terminal 100, thereby reproducing the selected content.

In operation S608, the mobile communication terminal 100 generates a content control screen used to control content reproduction. The content control screen may be divided into a screen used to control content reproduced by the mobile communication terminal 100, and a screen used to remotely control content reproduced by the display device. When a predetermined icon is selected on the content control screen, a selection window that allows selection of a display device may be displayed in order to allow the content to be reproduced by the other display device.

In operation S610, the mobile communication terminal 100 controls content reproduction in response to a user input via the content control screen. When a user input is received via the content control screen so as to control content reproduction in the display device, the mobile communication terminal 100 may generate a predetermined control command based on the user input and may provide the generated control command to the display device.

FIG. 13 illustrates a storage setting table, according to an exemplary embodiment of the present invention.

Referring to FIG. 13, the storage setting table may be generated and updated according to storage information collected by the mobile communication terminal 100 and a user input via a storage share setting screen.

The storage setting table includes an ID field 270, a user name field 271, a type field 272, an attribute field 273, a share setting field 274, a content field 275, and a currently-reproduced content field 276.

The ID field 270 includes an ID value of a storage, and the user name field 271 includes an ID value of a user of the storage. For example, a name of the user of the storage or a name of a group using the storage may be recorded to the user name field 271. The type field 272 may include a type of the storage, and for example, 'PC', 'PHONE', 'Net Storage', 'YouTube', or the like may be recorded to the type field 272.

The attribute field 273 may include information about whether the storage is a static storage or a dynamic storage. For example, when the storage is the static storage, 'Default' may be recorded to the attribute field 273. For example, when the storage is the dynamic storage, 'Scan' may be recorded to the attribute field 273.

The share setting field 274 may include information about whether sharing of content stored in the storage is activated, and for example, 'ON' or 'OFF' may be recorded thereto.

The content field 275 may include an ID value of the content that is stored in the storage, and the currently-reproduced content field 276 may include an ID value of content that is currently reproduced in at least one of the mobile communication terminal 100 and a display device.

Figure 14:
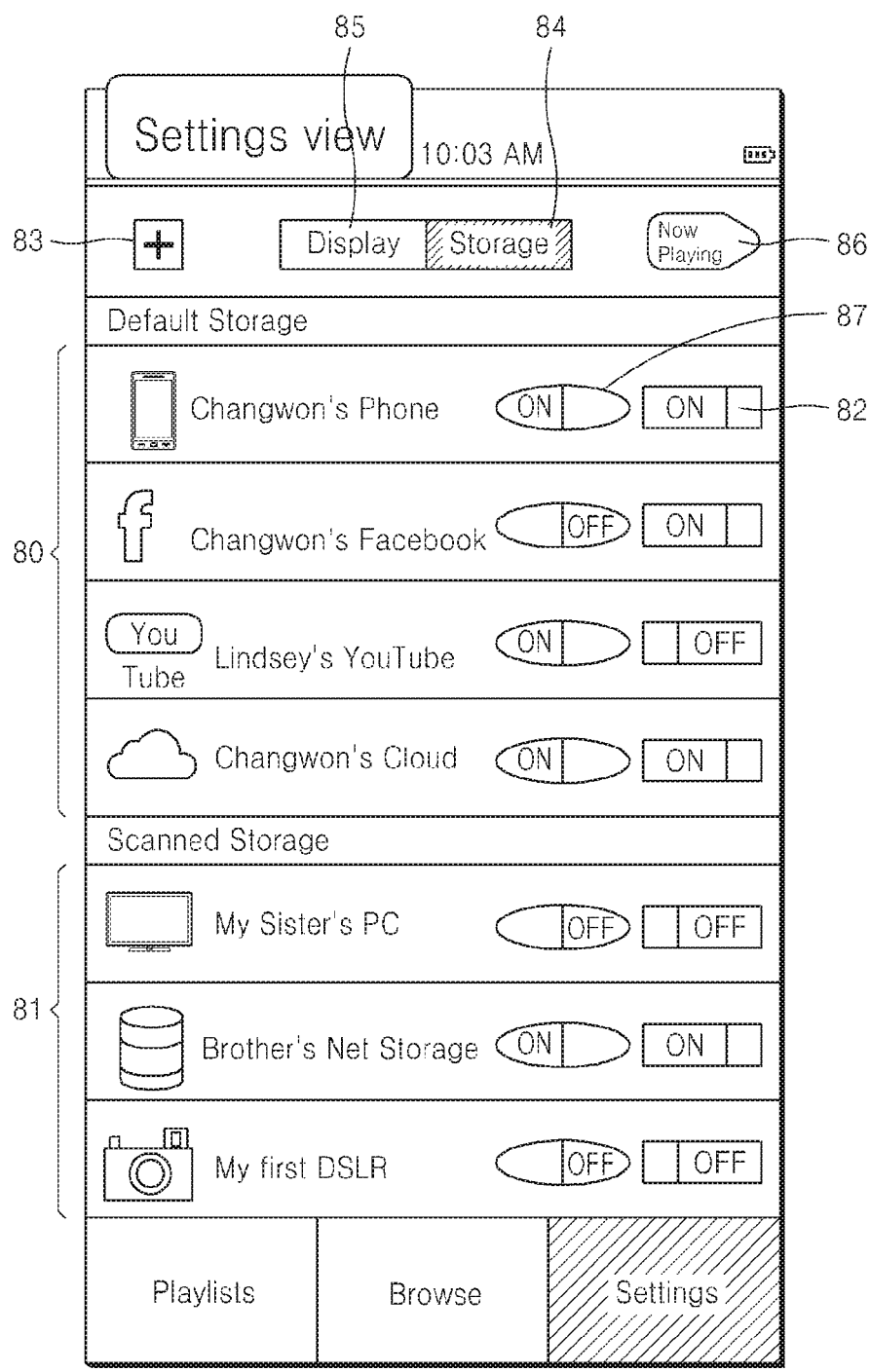
FIG. 14 illustrates a storage share setting screen, according to an exemplary embodiment of the present invention.

FIG. 14 illustrates a storage share setting screen, according to an exemplary embodiment of the present invention.

Referring to FIG. 14, a storage list 80 about static storages and a storage list 81 about dynamic storages may be displayed on different regions of the storage share setting screen. Each of the storage lists 80 and 81 may include share setting buttons 82. A user may select one of the share setting buttons 82 and then may change (e.g., configure) an ON or OFF status of the selected share setting button 82, so that the user may activate or deactivate sharing of content stored in a storage that corresponds to the selected share setting button 82.

Each of the storage lists 80 and 81 may include power setting buttons 87. The user may select one of the power setting buttons 87 and then may change an ON or OFF status of the selected power setting button 87, so that the user may control a power of a storage corresponding to the selected power setting button 87.

When a storage button 84 of the storage share setting screen is selected, a list of storages that are connected to or that can be connected to a mobile communication terminal may be displayed. When a display button 85 of the storage share setting screen is selected, a list of storages that are connected to the mobile communication terminal may be displayed.

When a button 83 of the storage share setting screen is selected, a window in which the user may directly select and add a storage or a display device may be displayed. The storage lists 80 and 81 included in the storage share setting screen may include a plurality of information about positions of a plurality of storages. Names of the plurality of storages included in the storage lists 80 and 81 may be changed based on a user input.

When a button 86 of the storage share setting screen is selected, an indication as to the media being currently played is displayed.

Figure 15:
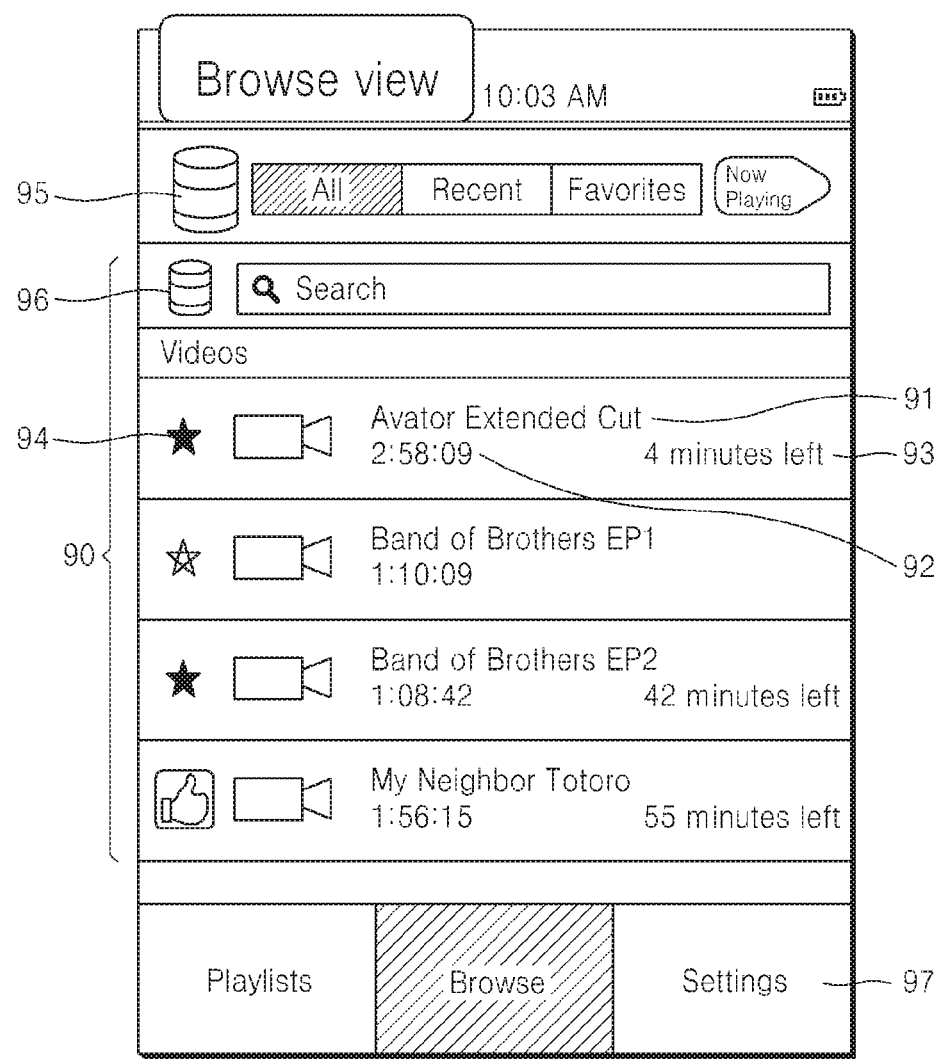
FIG. 15 illustrates a content-list screen, according to an exemplary embodiment of the present invention.

FIG. 15 illustrates a content-list screen, according to an exemplary embodiment of the present invention.

Referring to FIG. 15, the content-list screen may include a plurality of content-lists 90 and each of the content-lists may display a content title 91, a total reproduction time 92, a remaining reproduction time 93, and a favorite icon 94. With respect to content that was previously reproduced, the remaining reproduction time 93 may be displayed. When an icon 95 is selected, a storage share setting screen may be displayed. When an icon 96 is selected, a selection window for filtering a search target may be provided. When a setting field 97 is selected, a screen for sharing of content may be displayed.

Figure 16:
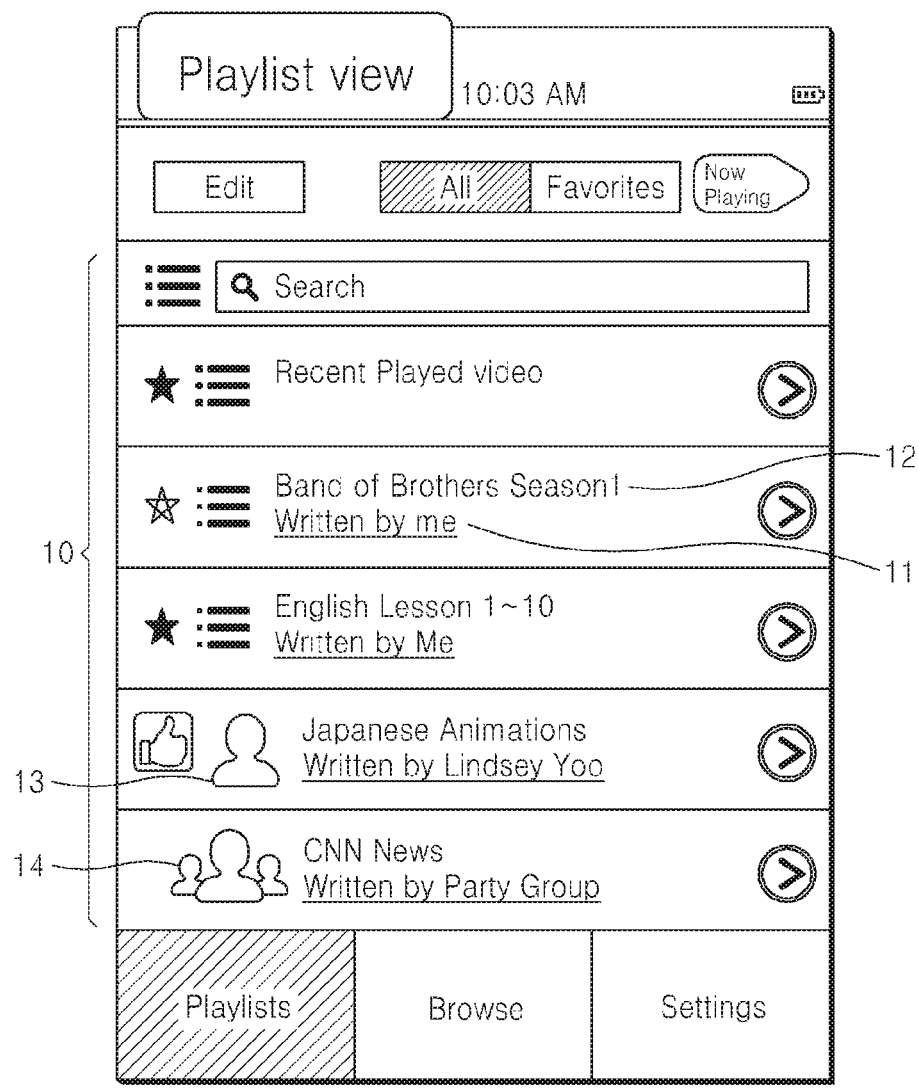
FIG. 16 illustrates a play-list screen, according to an exemplary embodiment of the present invention.

FIG. 16 illustrates a play-list screen, according to an exemplary embodiment of the present invention.

Referring to FIG. 16, the play-list screen may display a play-list relating to a plurality of content which are currently reproduced or previously reproduced. The play-list screen may display the play-list 10 of the plurality of content which are currently reproduced or previously reproduced by at least one of a storage, the mobile communication terminal 100, and a display device. The play-list screen may display the play-list and may display an ID value 11 of a user who provides the play-list, an ID value 12 of the play-list, and the like. The play-list may display pre-set images according to a type of the storage. For example, when the store is a mobile communication terminal of a friend of the user, the play-list may display a picture 13 of the friend, and when the storage is an SNS server, the play-list may display a group image 14 indicating a group that includes the user.

Figure 17:
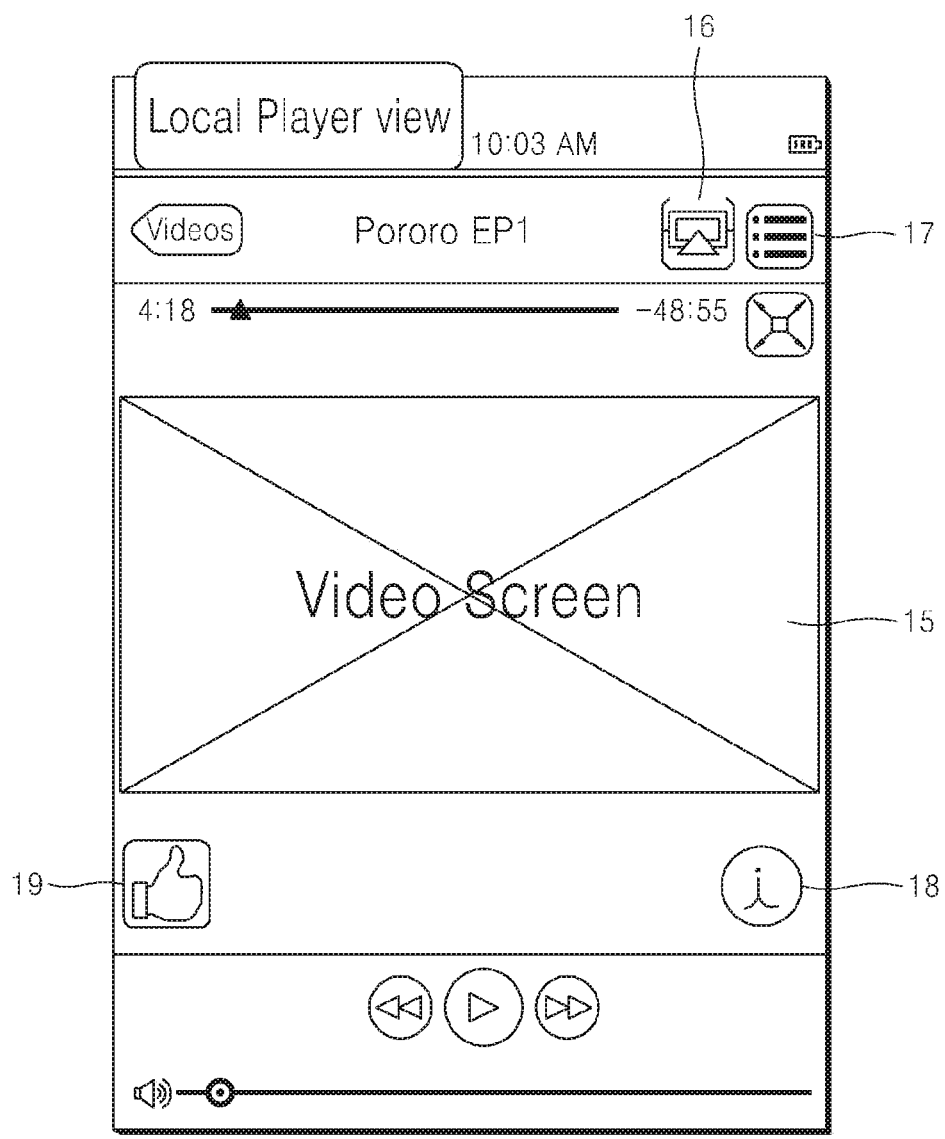
FIG. 17 illustrates a content control screen used to control content that is reproduced in a mobile communication terminal, according to an exemplary embodiment of the present invention.

FIG. 17 illustrates a content control screen used to control content that is reproduced in a mobile communication terminal, according to an exemplary embodiment of the present invention.

Referring to FIG. 17, an image of the content that is reproduced in the mobile communication terminal 100 may be displayed on a reproduction region 15 of the content control screen used to control content that is reproduced in the mobile communication terminal 100. When an icon 16 is selected, a selection window may be displayed for selection of a display device, and in this regard, a user may select a predetermined display device from the selection window, thereby allowing the currently-reproduced content to be reproduced in the selected display device.

When an icon 17 is selected, a play-list screen including the currently-reproduced content may be displayed. When an icon 18 is selected, additional information about the currently-reproduced content may be displayed. The icon 18 may be displayed only when the additional information corresponding to the content exists. The additional information about the content may be provided from, but not limited thereto, an SNS server that is connected with the mobile communication terminal 100.

When an icon 19 is selected, information about the currently-reproduced content may be provided from the mobile communication terminal 100 to a predetermined SNS server. A selection window may be displayed for selection of an SNS server.

Figure 18:
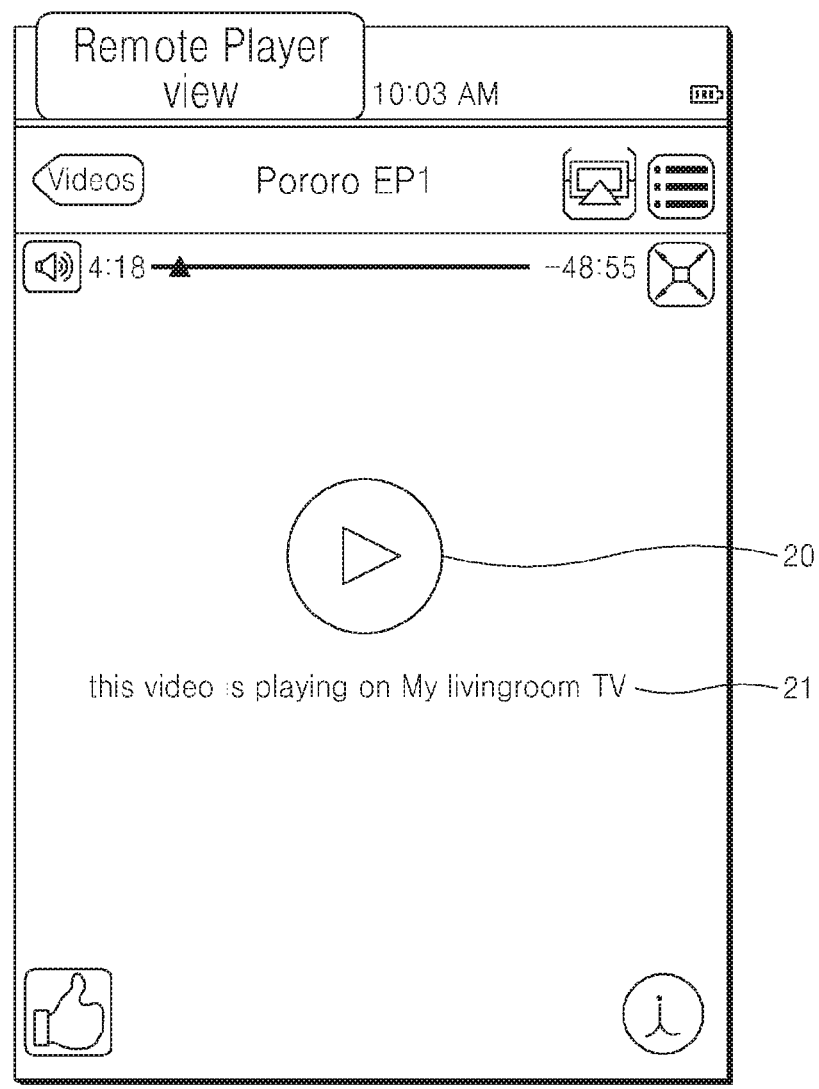
FIG. 18 illustrates a content control screen used to control content that is reproduced in a display device connected to a mobile communication terminal, according to an exemplary embodiment of the present invention.

FIG. 18 illustrates a content control screen used to control content that is reproduced in a display device connected with a mobile communication terminal, according to an exemplary embodiment of the present invention.

Referring to FIG. 18, a control button 20 to control reproduction of content may be displayed on the content control screen used to control the content that is reproduced in the display device. An indication 21 as to the display device displaying the content is displayed.

Figure 19:
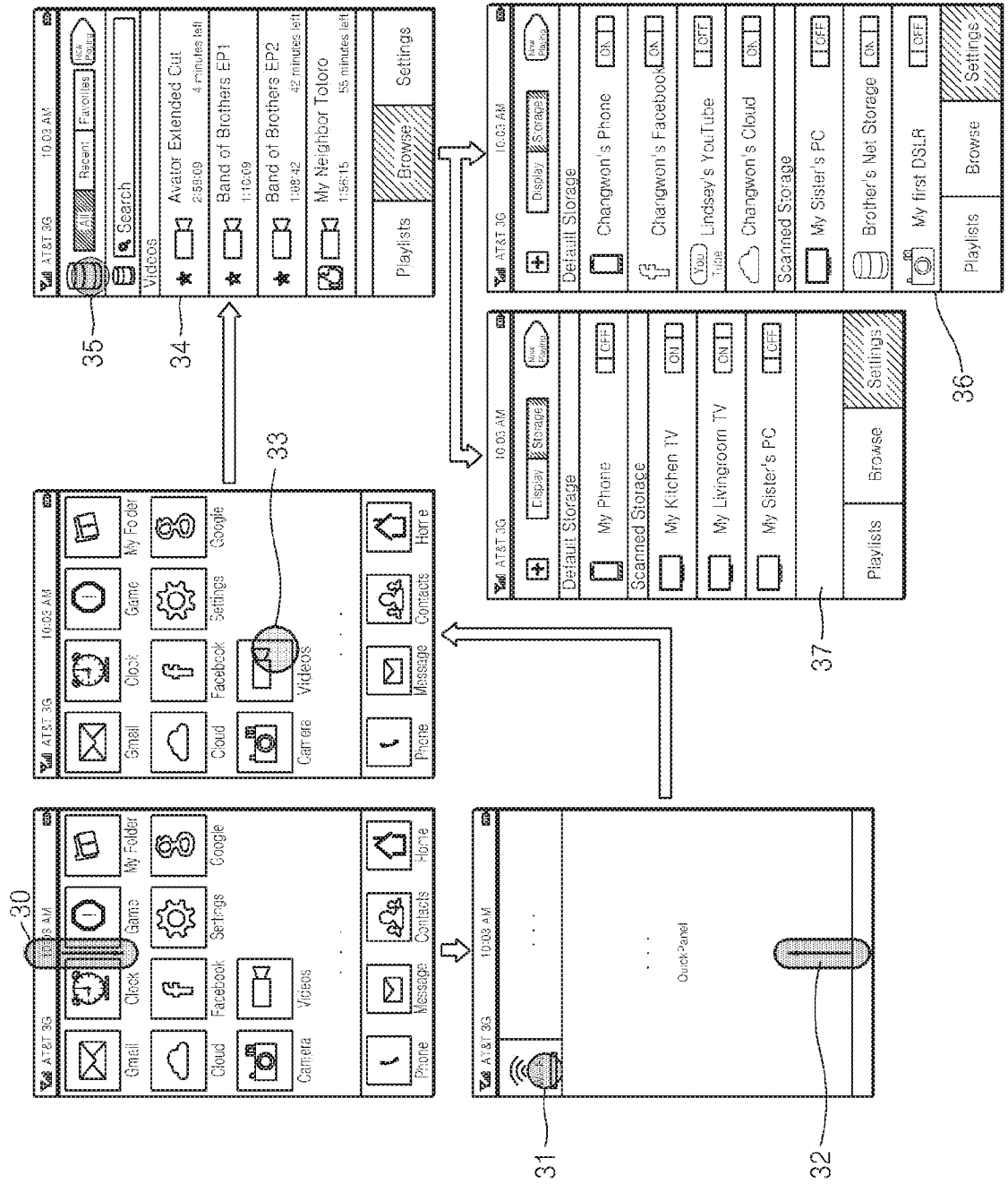
FIG. 19 illustrates an example in which a storage share setting screen is generated and displayed in a mobile communication terminal, according to an exemplary embodiment of the present invention.

FIG. 19 illustrates an example in which a storage share setting screen is generated and displayed in a mobile communication terminal, according to an exemplary embodiment of the present invention.

Referring to FIG. 19, when a panel slides from an upper portion toward a lower portion of the mobile communication terminal 100 and is displayed in response to a user input 30, and a Wi-Fi communication function of the mobile communication terminal 100 is activated based on a user input 31 via the panel, the mobile communication terminal 100 may search for a storage or a display device which is connected with the mobile communication terminal 100.

When the panel returns to the upper portion in response to a user input 32, and an icon 33 is selected, a content-list screen 34 may be displayed. Also, when an icon 35 is selected from the content-list screen 34, a storage share setting screen 36 may be displayed so as to show one or more searched storages. Alternatively, a screen 37 that shows one or more searched display devices may be displayed.

Figure 20:
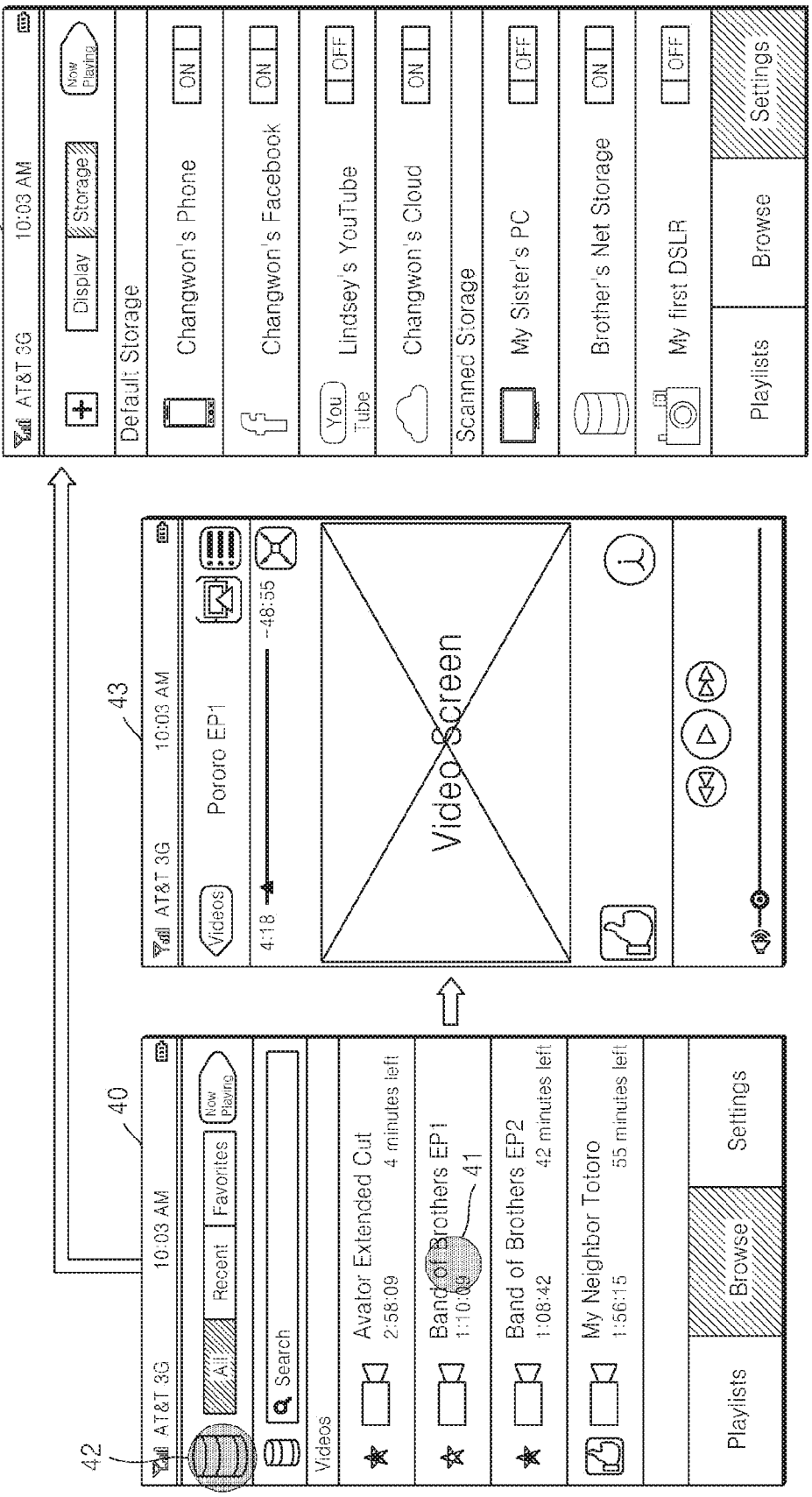
FIG. 20 illustrates an example in which a content control screen and a storage share setting screen are displayed from a content-list screen in a mobile communication terminal, according to an exemplary embodiment of the present invention.

FIG. 20 illustrates an example in which a content control screen and a storage share setting screen are displayed from a content-list screen in a mobile communication terminal, according to an exemplary embodiment of the present invention.

Referring to FIG. 20, when a predetermined content-list 41 is selected from the content-list screen 40, selected content may be reproduced in the mobile communication terminal 100, and the content control screen 43 to control the selected content may be displayed. When an icon 42 is selected from the content-list screen 40, the storage share setting screen 44 may be displayed to show one or more searched storages.

Figure 21:
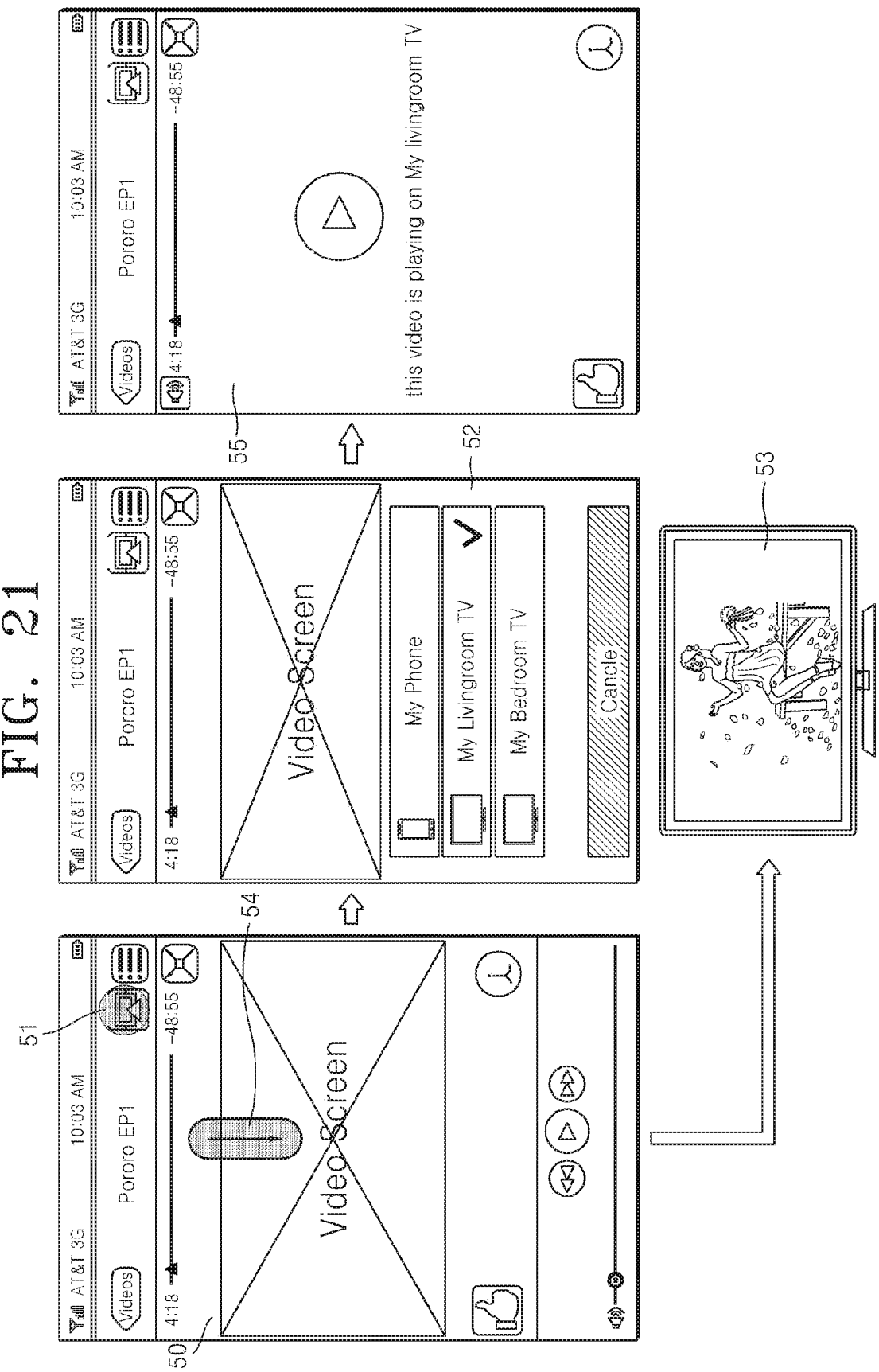
FIG. 21 illustrates an example in which content is reproduced in a display device connected with a mobile communication terminal, and a content control screen is displayed on the mobile communication terminal so as to control the content that is reproduced in the display device, according to an exemplary embodiment of the present invention.

FIG. 21 illustrates an example in which content is reproduced in a display device connected with a mobile communication terminal, and a content control screen is displayed on a mobile communication terminal so as to control the content that is reproduced in the display device, according to an exemplary embodiment of the present invention.

Referring to FIG. 21, when an icon 51 is selected from a content control screen 50 used to control content that is reproduced in the mobile communication terminal 100, a selection window 52 may be displayed for selection of a display device. When a user selects a display device 53, the mobile communication terminal 100 may provide content or link information about the content to the selected display device 53, and the display device 53 may directly reproduce the content or may reproduce the content by using the link information about the content.

When the content is reproduced in the display device 53, a content control screen 55 may be displayed on the mobile communication terminal 100 so as to control the content that is reproduced in the display device 53.

When a predetermined gesture 54 is input via the content control screen 50, a predetermined display device may be automatically selected, and content may be reproduced in the selected display device 53.

Figure 22:
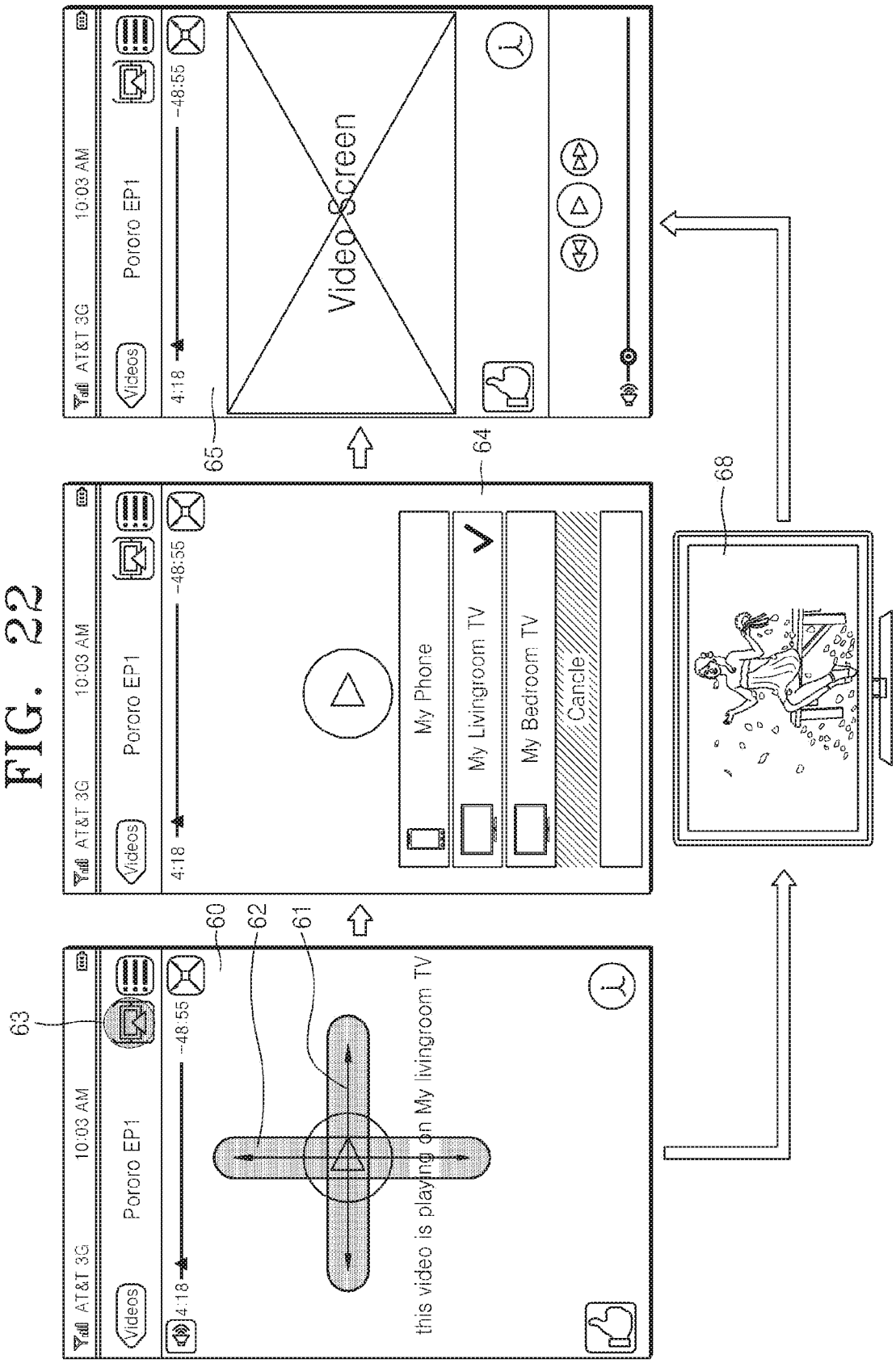
FIG. 22 illustrates an example in which a mobile communication terminal controls content, which is reproduced in a display device, via a content control screen, and the mobile communication terminal subsequently reproduces the content that is reproduced in the display device, according to an exemplary embodiment of the present invention.

FIG. 22 illustrates an example in which a mobile communication terminal controls content, which is reproduced in a display device, via a content control screen, and the mobile communication terminal subsequently reproduces the content that is reproduced in the display device, according to an exemplary embodiment of the present invention.

Referring to FIG. 22, when a flick in a left-right direction 61 is input via the content control screen 60, the mobile communication terminal 100 may transmit a control command to the display device 68, wherein the control command corresponds to a forward/backward change in a reproduction position (e.g., a fast-forward/rewind function). When a flick in an upper-lower direction 62 is input via the content control screen 60, the mobile communication terminal 100 may transmit a control command to the display device 68, wherein the control command corresponds to changing the volume of playback of the content (e.g., turning up or down the volume).

When an icon 63 is selected from the content control screen 60, a display-device list 64 of display devices via which a user may subsequently view content is displayed. When the user selects 'My Phone' from the display-device list 64, the content that is reproduced in the display device 68 may be subsequently reproduced in the mobile communication terminal 100, and a content control screen 65 may be displayed on the mobile communication terminal 100.

Figure 23:
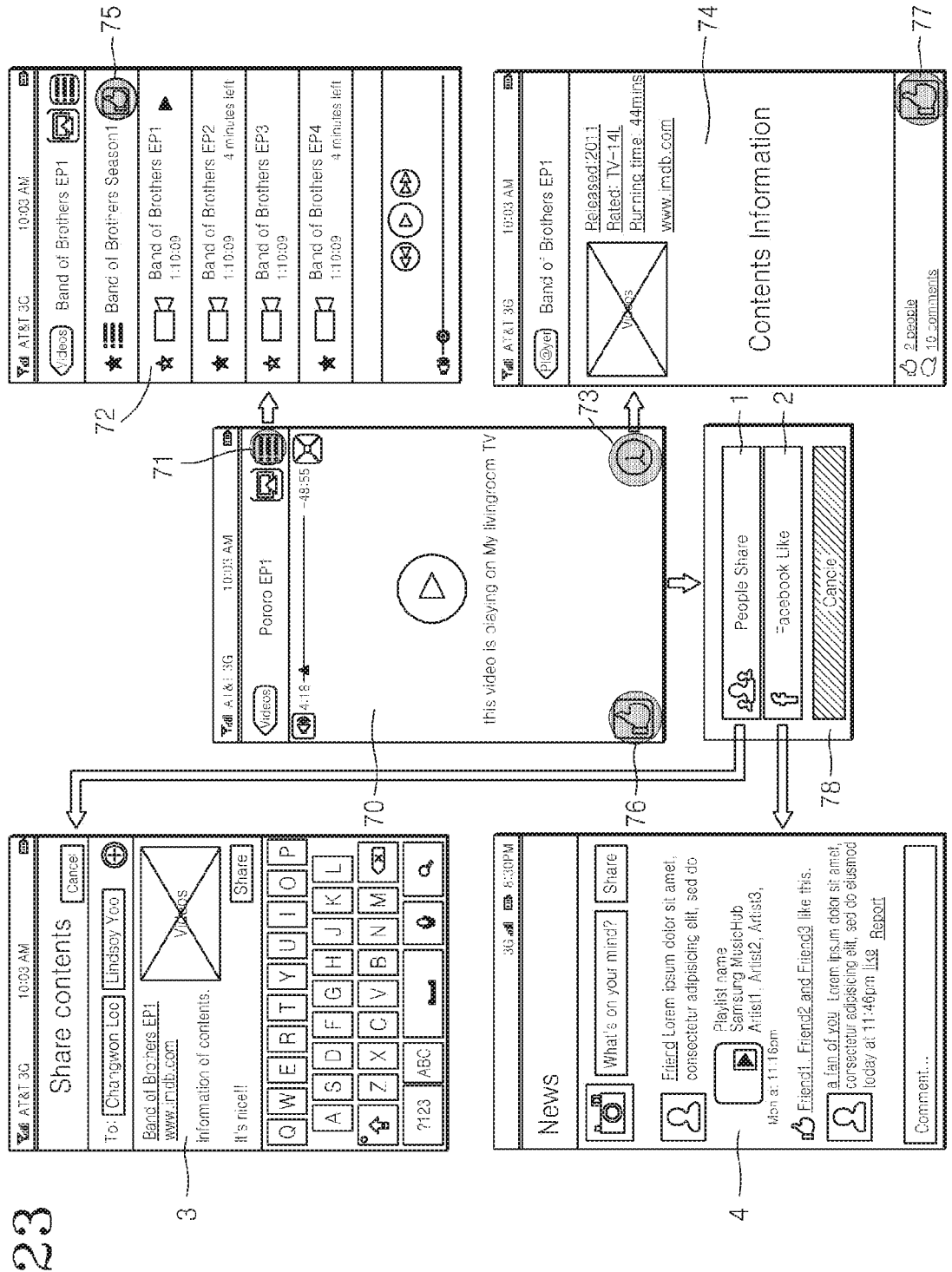
FIG. 23 illustrates an example in which additional information about content is shared via a content control screen, according to an exemplary embodiment of the present invention.

FIG. 23 illustrates an example in which additional information about content is shared via a content control screen, according to an exemplary embodiment of the present invention.

Referring to FIG. 23, when an icon 71 is selected from the content control screen 70, a content reproduction list screen may be displayed. When an icon 73 is selected from the content control screen 70, an additional information screen 74 including additional information about content may be displayed. When an icon 76 is selected from the content control screen 70, information about the content may be displayed.

When an icon 73 of the content control screen 70, an icon 75 of a content-list screen 72, or an icon 77 of the additional information screen 74 is selected, a selection window 78 for selection of a target to receive the additional information about content may be displayed. The icon 73 may be displayed when the additional information corresponding to the content exists.

For example, when a user selects a 'Facebook Like' field 2, a screen 4 may be displayed on the mobile communication terminal 100 so as to transmit the additional information about the content to a predetermined SNS server.

As another example, when the user selects a 'People Share' field 1, a screen 3 may be displayed on the mobile communication terminal 100 so as to transmit a message including the additional information about the content to a predetermined user.

When the user selects the 'People Share' field 1, a phone book stored in the mobile communication terminal 100 may be displayed. The phone book may include a user-list of a plurality of users, and the user-list may be displayed according to groups. The groups of the user-list may include a social group, an external SNS group, an instant group, a recent call group, and the like.

FIGS. 24A to 24E illustrate a phone book, according to an exemplary embodiment of the present invention.

Referring to FIGS. 24A to 24E, the phone book may include a favorite tab 1210, a recent call tab 1220, a contact tab 1230, a group tab 1240, and personal information tab 1250.

Figure 24A:
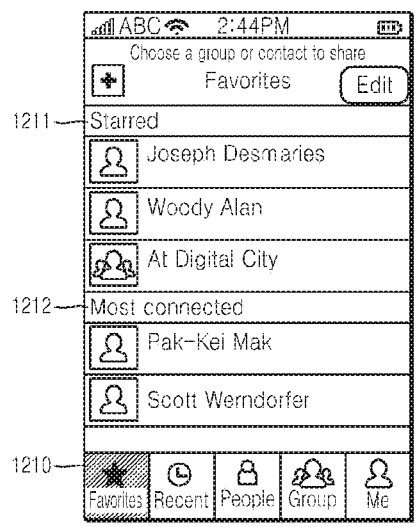
FIGS. 24A to 24E illustrate a phone book, according to an exemplary embodiment of the present invention.

FIG. 24A illustrates a screen of an example in which a first user selects the favorite tab 1210 of the phone book.

The mobile communication terminal 100 may receive selection with respect to the favorite tab 1210 of the phone book from the first user. In this case, the mobile communication terminal 100 may provide a list of a second user that is added to the favorite tab 1210 by the first user, a list of a second user that communicates with the first user more than a predetermined number of times for a predetermined time period, or the like.

For example, as illustrated in FIG. 24A, the mobile communication terminal 100 may provide a list 1211 of a second user that is added to a favorite by the first user via the favorite tab 1210. The list 1211 of a second user may include not only an individual person but also may include a group.

Also, the mobile communication terminal 100 may provide a list 1212 of a second user that communicates with the first user more than a predetermined number of times within a predetermined time period. For example, the mobile communication terminal 100 may provide a person or a group which most frequently contacts the first user in recent times.

Figure 24B:

FIG. 24B illustrates a screen of an example in which the first user selects the recent call tab 1220 of the phone book.

The mobile communication terminal 100 may receive selection with respect to the recent call tab 1220 of the phone book from the first user. In this case, the mobile communication terminal 100 may provide a list of second users that communicate with the first user within a predetermined time from a current time. For example, the mobile communication terminal 100 may array the second users according to a recent contact order and may provide the list of the second users. The list of the second users may include an individual 1221 or a group 1222.

Figure 24C:

FIG. 24C illustrates a screen of an example in which the first user selects the contact tab 1230 of the phone book. A contact list of the phone book may display a profile of a second user, a name of the second user, or the like. In addition, the contact list of the phone book may show second users 1231 having a device that provides a social group function.

The mobile communication terminal 100 may receive an external device search request of the first user. In response to the external device search request of the first user, the mobile communication terminal 100 may search for devices of second users which are listed in the phone book and which are within a predetermined distance from the mobile communication terminal 100. The mobile communication terminal 100 may provide a list of the second users having the searched devices.

Figure 24D:
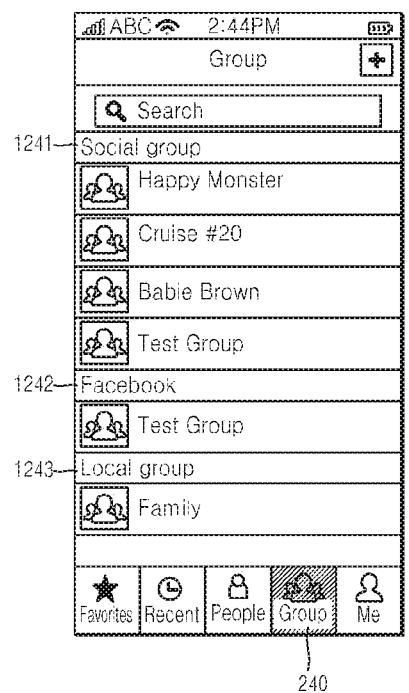

FIG. 24D illustrates a screen of an example in which the first user selects the group tab 1240 of the phone book. As described above, when the group tab 1240 of the phone book is selected, the mobile communication terminal 100 may provide at least one of group lists including a social group list 1241, an external SNS group list 1242, an instant group list, and a local group list 1243.

Figure 24E:
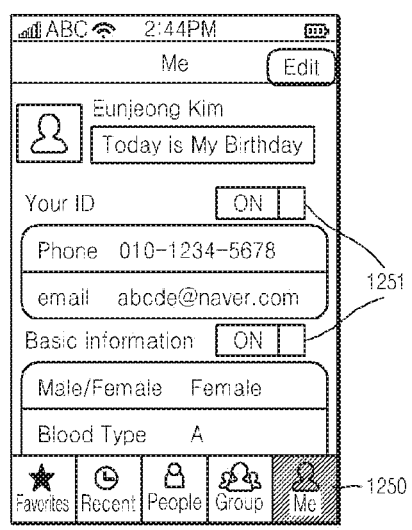

FIG. 24E illustrates a screen of an example in which the first user selects the personal information tab 1250 of the phone book. As described above with reference to FIG. 11, when the personal information tab 1250 of the phone book is selected, the mobile communication terminal 100 may provide a setting object 1251 for each of a plurality of pieces of personal information, wherein the setting object 1251 corresponds to setting personal information of the first user and a publication extent of the personal information of the first user.

The one or more exemplary embodiments of the present invention may be embodied as a non-transitory recording medium (e.g., a program module to be executed in computers) which include computer-readable commands. The computer storage medium may include any usable medium that may be accessed by computers, volatile and non-volatile media, and detachable and non-detachable media. The computer storage medium may include a computer storage medium and a communication medium. The computer storage medium includes all volatile and non-volatile media, and detachable and non-detachable media which are designed to store information including computer readable commands, data structures, program modules, or other data. The communication medium includes computer-readable commands, a data structure, a program module, and other transmission mechanism, and includes other information transmission mediums. The computer storage medium may be a non-transitory computer-readable storage medium.

The present invention may, however, be embodied in many different forms and should not be construed as being limited to the exemplary embodiments set forth herein; rather, these exemplary embodiments of the present invention are provided so that this disclosure will be thorough and complete, and will fully convey the inventive concept to those of ordinary skill in the art. For example, configuring elements that are singular forms may be executed in a distributed fashion, and also, configuring elements that are distributed may be combined and then executed.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A mobile communication terminal, the mobile communication terminal comprising:
    a display; and
    a processor configured to:
        based on a network communication being activated, access a plurality of storages that are connectable to the mobile communication terminal,
        obtain a plurality of storage information from the plurality of storages,
        determine a first group comprising a predetermined static storage connected to the mobile communication terminal prior to displaying a storage screen, from among the plurality of storages,
        determine a second group comprising a dynamic storage whose connection with the mobile communication terminal is currently being scanned when the storage screen is displayed, from among the plurality of storages,
        control the display to display the storage screen comprising the first group and the second group in different regions from each other based on the obtained plurality of storage information, and
        control respective power of the plurality of the storages according to a user input via the storage screen,
    wherein the first group includes at least one social network service (SNS).

2. The mobile communication terminal of claim 1, wherein the processor is further configured to:

generate the storage screen comprising a storages-list of the plurality of storages, and display a share setting button so as to separately configure sharing of content in the storages-list.

3. The mobile communication terminal of claim 1, wherein the processor is further configured to activate sharing of content stored in the plurality of storages, for each of the plurality of storages, in response to a user input via the storage screen.

4. The mobile communication terminal of claim 1, wherein the processor is further configured to divide the plurality of storages according to a communication method between the mobile communication terminal and the plurality of divided storages.

5. The mobile communication terminal of claim 1, wherein the processor is further configured to:

generate a content-list screen displaying a list of a plurality of content comprised in the storage that is activated with respect to content sharing among the plurality of storages, select content comprised in the content-list screen in response to a user input via the content-list screen, and request reproduction of the selected content to a display device that is connected with the mobile communication terminal.

6. The mobile communication terminal of claim 5, wherein the processor is further configured to:

receive link information corresponding to the selected content from the storage storing the selected content, and provide the link information to the display device.

7. The mobile communication terminal of claim 5, wherein the processor is further configured to, as the display device reproduces the selected content, generate a content control screen so as to remotely control the display device.

8. The mobile communication terminal of claim 1, wherein the processor is further configured to generate a play-list screen comprising a play-list related to a plurality of content that are currently reproduced and that are from among a plurality of content stored in the plurality of storages.

9. The mobile communication terminal of claim 1, wherein the storage information comprises an IDentification (ID) value of the storage, an ID value of content stored in the storage, a type of the storage, and a communication method used between the storage and the mobile communication terminal.

10. The mobile communication terminal of claim 1, wherein the plurality of storages are at least one of a social network service (SNS) server, a content providing server, a PC, a smart TV, a tablet PC, or a storage medium of another user.

11. A method being performed by a mobile communication terminal, the method comprising:

based on a network communication being activated, accessing a plurality of storages that are connectable to the mobile communication terminal;

obtaining a plurality of storage information from the plurality of storages;

determining a first group comprising a predetermined static storage connected to the mobile communication terminal prior to displaying a storage screen, from among the plurality of storages;

determining a second group comprising a dynamic storage whose connection with the mobile communication terminal is currently being scanned when the storage screen is displayed, from among the plurality of storages;

displaying the storage screen comprising the first group and the second group in different regions from each other based on the obtained plurality of storage information; and controlling respective power of the plurality of the storages according to a user input via the storage screen, wherein the first group includes at least one social network service (SNS).

12. The method of claim 11, further comprising:

generating the storage screen comprising a storages-list of the plurality of storages; and displaying a share setting button so as to separately configure sharing of content in the storages-list.

13. The method of claim 11, further comprising activating sharing of content stored in the plurality of storages, for each of the plurality of storages, in response to a user input via the storage screen.

14. The method of claim 11, further comprising dividing the plurality of storages according to a communication method between the mobile communication terminal and the divided plurality of storages.

15. The method of claim 11, further comprising:

generating a content-list screen displaying a list of a plurality of content comprised in the storage that is activated with respect to content sharing among the plurality of storages;

selecting content comprised in the content-list screen in response to a user input via the content-list screen; and requesting reproduction of the selected content to a display device that is connected to the mobile communication terminal.

16. The method of claim 15, wherein the requesting of the reproduction of the selected content comprises:

receiving link information corresponding to the selected content from the storage storing the selected content, and providing the link information to the display device.

17. The method of claim 15, further comprising, as the display device reproduces the selected content, generating a content control screen so as to remotely control the display device.

18. The method of claim 11, further comprising generating a play-list screen comprising a play-list related to a plurality of content that are currently reproduced and that are from among a plurality of content stored in the plurality of storages.

19. The method of claim 11, wherein the storage information comprises an IDentification (ID) value of the storage, an ID value of content stored in the storage, a type of the storage, and a communication method used between the storage and the mobile communication terminal.

20. A system for sharing content by using a plurality of storages, the system comprising:

a plurality of storages connected to a mobile communication terminal, and configured to provide, to the mobile communication terminal, at least one of content or link information about the content; and the mobile communication terminal configured to:

based on a network communication being activated, access a plurality of storages that are connectable to the mobile communication terminal, obtain a plurality of storage information from the plurality of storages, determine a first group comprising a predetermined static storage connected to the mobile communication terminal prior to displaying a storage screen, from among the plurality of storages, determine a second group comprising a dynamic storage whose connection with the mobile communication terminal is currently being scanned when the storage screen is displayed, from among the plurality of storages, control a display to display the storage screen comprising the first group and the second group in different regions from each other based on the obtained plurality of storage information, and control respective power of the plurality of the storages according to a user input via the storage screen, wherein the first group includes at least one social network service (SNS).

21. A mobile communication terminal comprising:
a display; and
a processor configured to:
  based on a communication being activated, access a plurality of storages that are connectable to the mobile communication terminal,
  obtain a plurality of storage information from the plurality of storages,
  determine a first group comprising a predetermined static storage connected to the mobile communication terminal prior to displaying a storage screen, from among the plurality of storages,
  determine a second group comprising a dynamic storage whose connection with the mobile communication terminal is currently being scanned when the storage screen is displayed, from among the plurality of storages,
  control the display to display a user interface screen including a first region for providing the first group of storages and a second region for providing the second group of storages based on the obtained plurality of storage information, and
  control respective power of the plurality of the storages according to a user input via the storage screen
wherein one or more storages associated with the first group corresponds with one or more network servers including a social networking service (SNS), and one or more storages associated with the second group corresponds with one or more portable storage medium devices.

22. The mobile communication terminal of claim 21, wherein the user interface screen comprises a storage share setting screen.

23. The mobile communication terminal of claim 21, wherein the network servers comprise an SNS server and a cloud server.

* * * * *